United States Patent
Rothenberg

(10) Patent No.: US 10,037,020 B2
(45) Date of Patent: Jul. 31, 2018

(54) SYSTEM AND METHODS FOR CREATING A SEAMLESS MESH EXHIBITING LOCALIZED CUSTOMIZATION TO FILL A MULTIDIMENSIONAL INPUT SURFACE

(71) Applicant: nTopology Inc., New York City, NY (US)

(72) Inventor: Bradley A. Rothenberg, New York City, NY (US)

(73) Assignee: nTopology Inc., New York City, NY (US)

(*) Notice: Subject to any disclaimer, the term of this patent is extended or adjusted under 35 U.S.C. 154(b) by 300 days.

(21) Appl. No.: 14/624,578

(22) Filed: Feb. 17, 2015

(65) Prior Publication Data

US 2016/0236417 A1 Aug. 18, 2016

(51) Int. Cl.
| | | |
|---|---|---|
| *G06F 19/00* | (2018.01) | |
| *B28B 7/22* | (2006.01) | |
| *G05B 19/4099* | (2006.01) | |
| *B33Y 50/00* | (2015.01) | |

(52) U.S. Cl.
CPC ......... *G05B 19/4099* (2013.01); *B33Y 50/00* (2014.12); *G05B 2219/35134* (2013.01); *G05B 2219/49007* (2013.01); *Y02P 90/265* (2015.11)

(58) Field of Classification Search
CPC ...................................................... G06F 17/50
USPC ........................................................ 700/98
See application file for complete search history.

(56) References Cited

U.S. PATENT DOCUMENTS

| | | | | |
|---|---|---|---|---|
| 8,993,061 | B2* | 3/2015 | Jones ................... | A43B 3/0084 12/142 R |
| 9,367,651 | B2* | 6/2016 | Algreatly ................ | G06F 17/50 |
| 2014/0209098 | A1* | 7/2014 | Dunn ................ | A61M 16/0683 128/206.21 |

(Continued)

FOREIGN PATENT DOCUMENTS

JP 2016031743 A * 3/2016

OTHER PUBLICATIONS

Wong et al, A Review of Additive Manufacturing, 2012, International Scholary Research Network, pp. 10.*

(Continued)

*Primary Examiner* — Suresh Suryawanshi
(74) *Attorney, Agent, or Firm* — AEON Law, PLLC; Adam L. K. Philipp; David Cohen

(57) ABSTRACT

Dynamic cellular microstructure designs customize production in an additive manufacturing construction. A seamless mesh generated from an input shape, based on available scans and/or surface designs, is supplemented with curvature data derived from the input shape. Redesign of a base shape and/or group of base shapes within a seamless mesh enable customization in localized areas of the seamless mesh. The seamless mesh may also be retopologized according to localized feature attractor points. Base shape redesign includes cellular replication, subdivision, growth, and/or modification to adjust variable material properties. Modification changes relative opacity, stretch, drape, compressive strength, plasticity, yield strength, resilience, and Poisson's ratio specific to geometry of a base shape. Each base shape can also exhibit modifiable isotropic or anisotropic properties.

20 Claims, 36 Drawing Sheets

(56) References Cited

U.S. PATENT DOCUMENTS

| | | | |
|---|---|---|---|
| 2015/0321434 A1* | 11/2015 | Sterman | B29D 35/12 264/255 |
| 2016/0048609 A1* | 2/2016 | Voris | G06F 17/50 700/98 |
| 2016/0170387 A1* | 6/2016 | Ihara | B29C 67/0088 700/119 |

OTHER PUBLICATIONS

Electroloom, The World's First 3D Fabric Printer, Electroloom, May 15, 2015, pp. 37.*

* cited by examiner

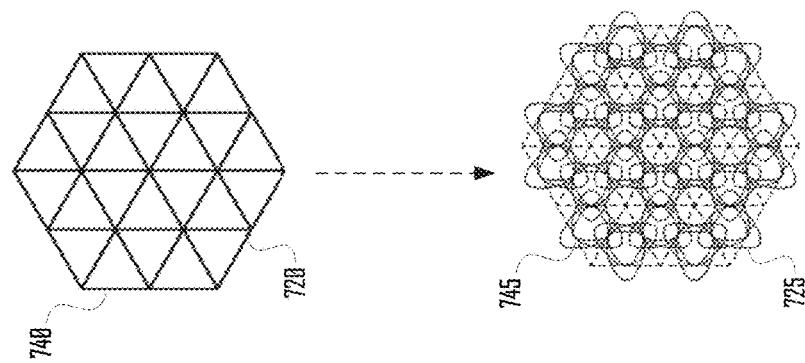
*FIG.7D*
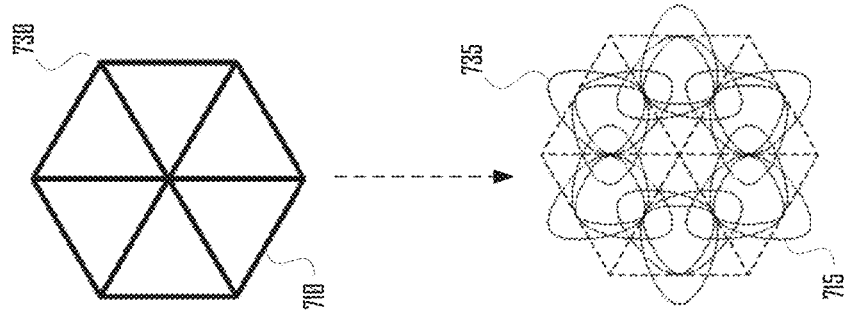
*FIG.7C*
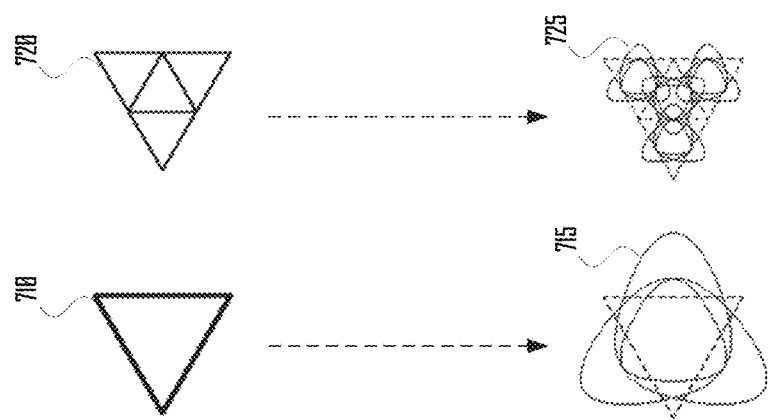
*FIG.7B*  *FIG.7A*

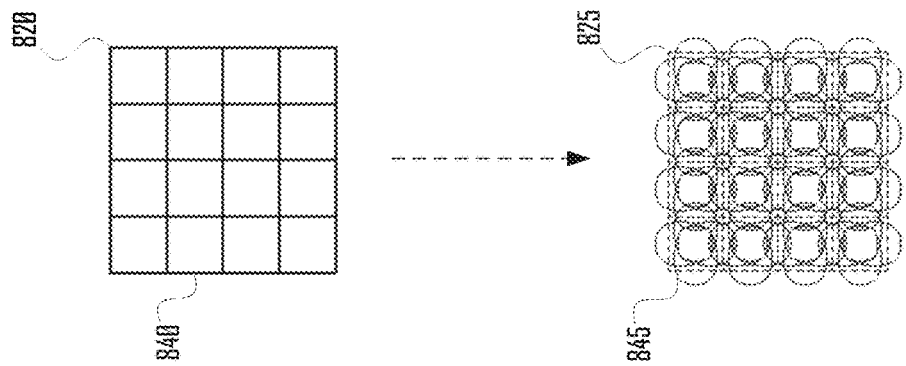
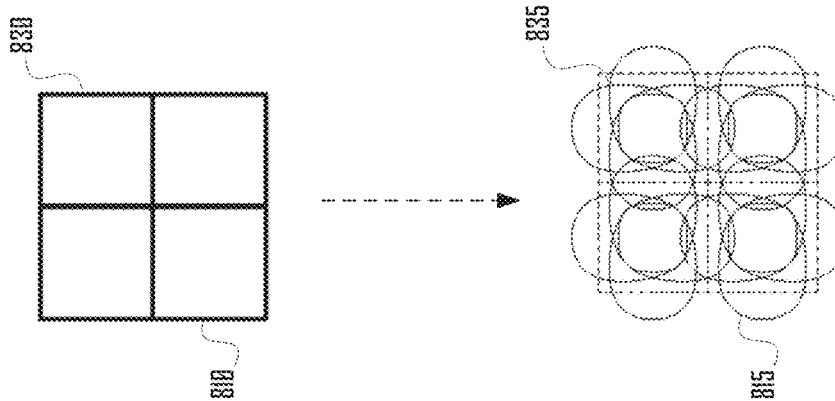
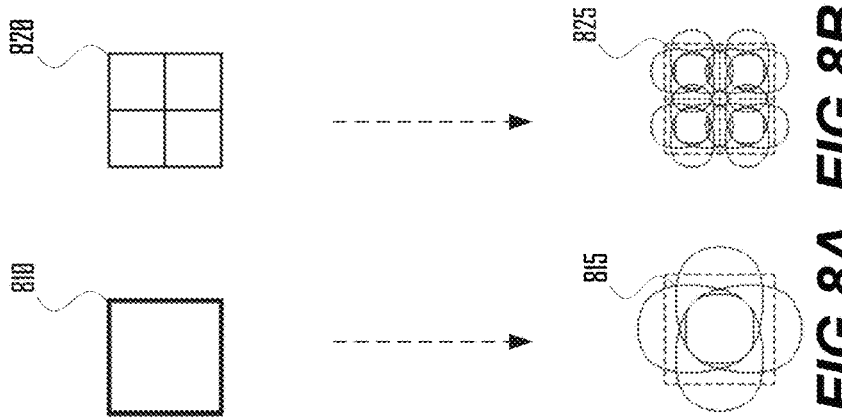

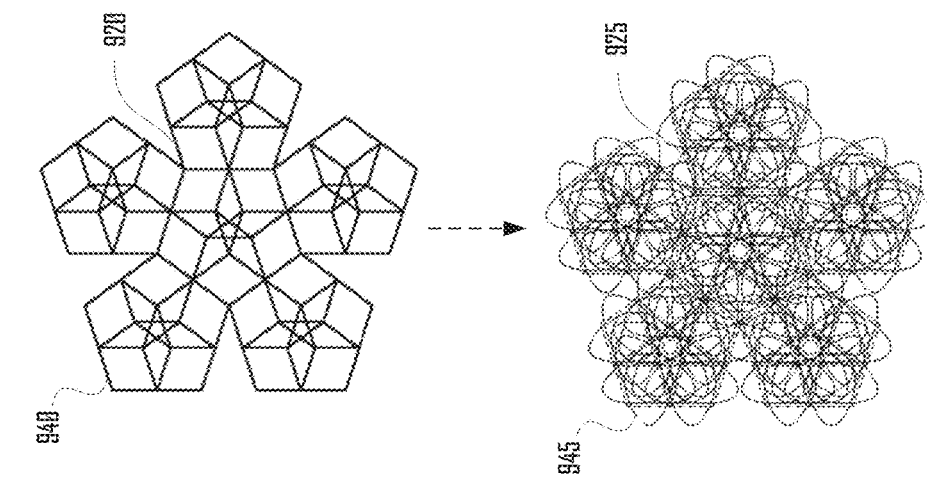
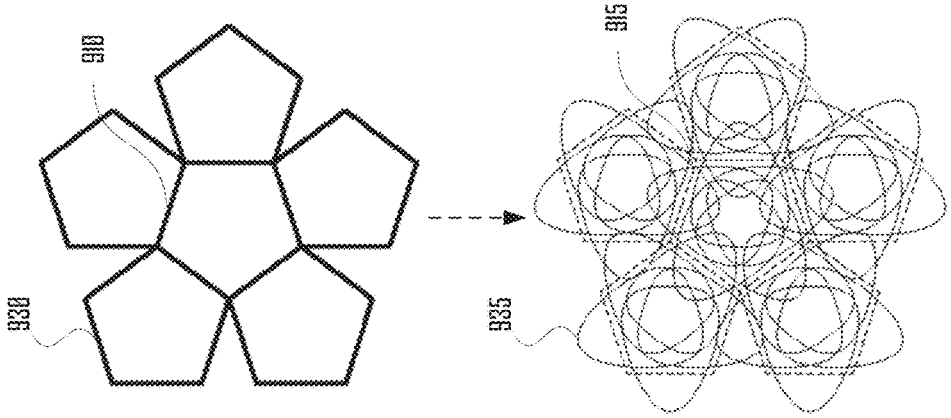
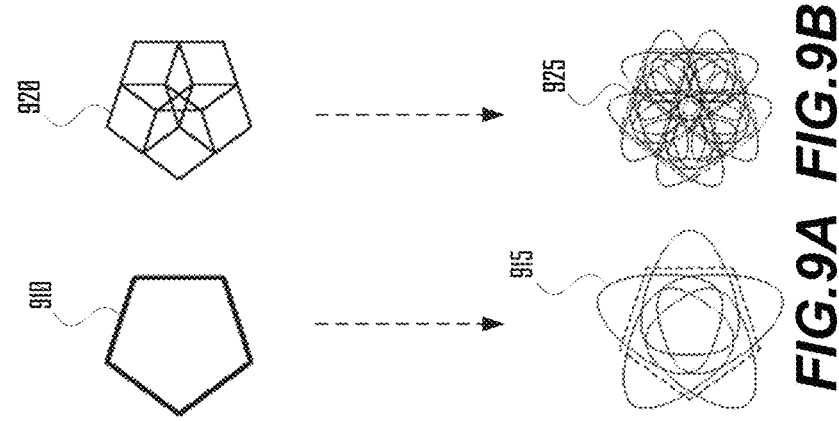
FIG. 9A FIG. 9B FIG. 9C FIG. 9D

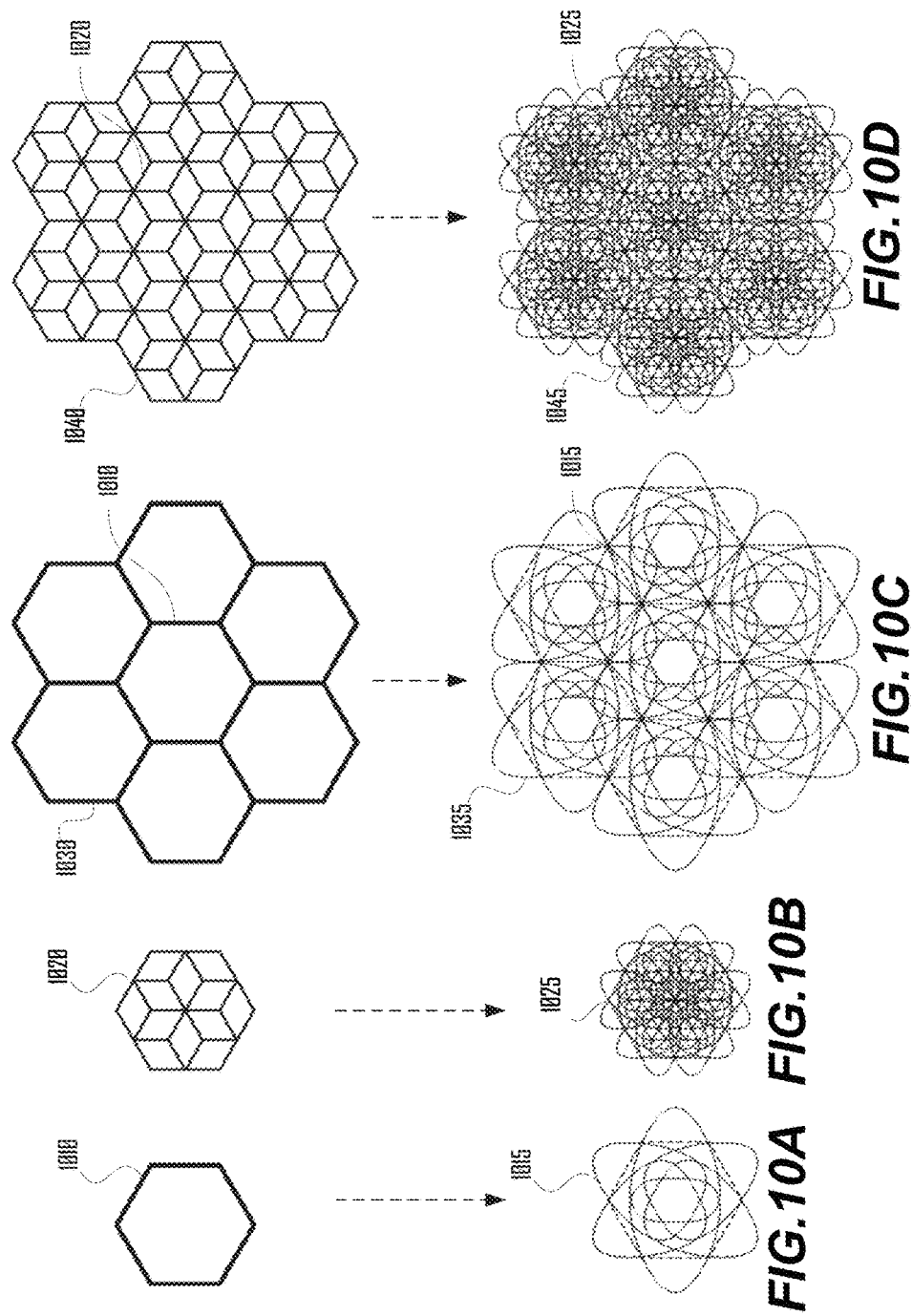

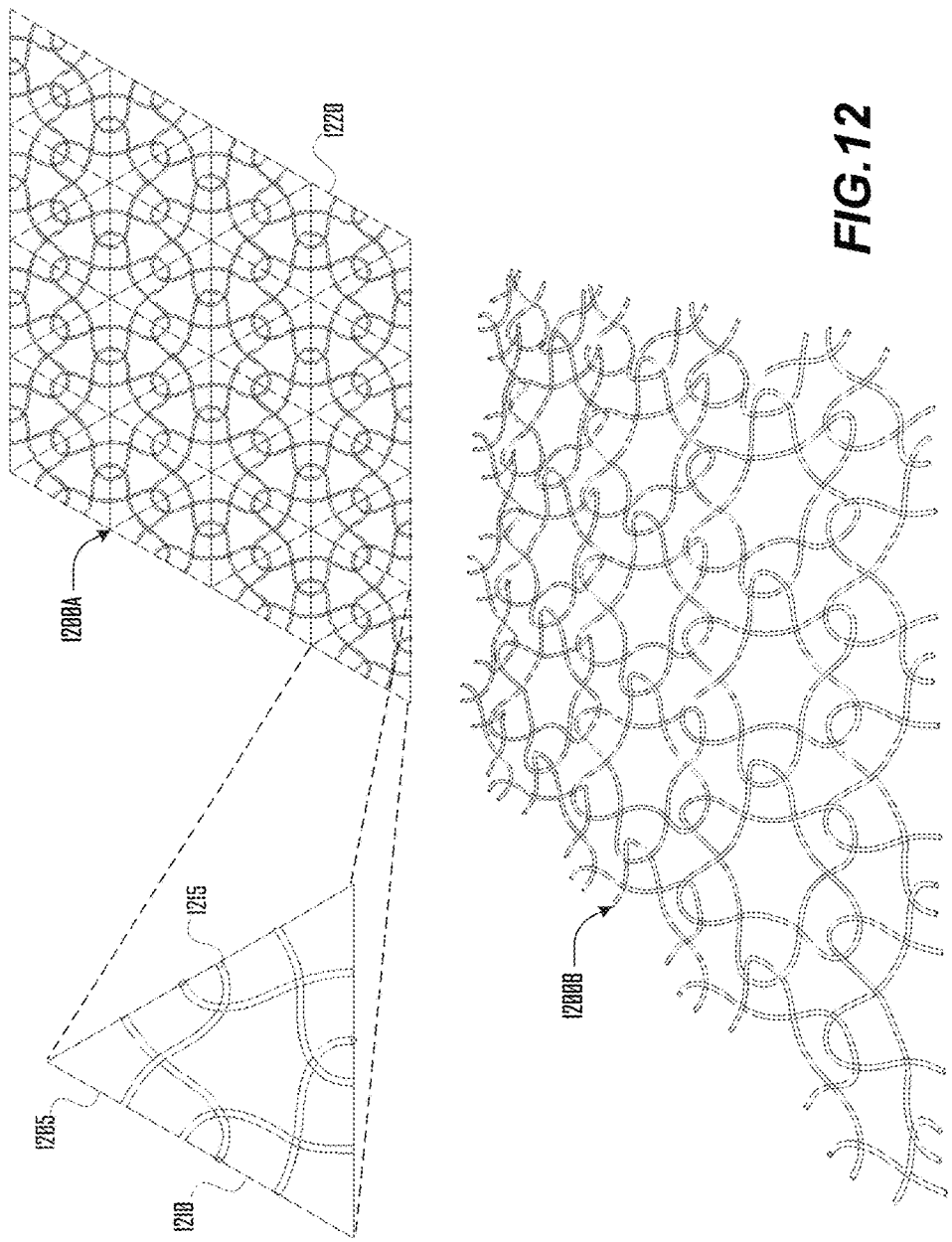

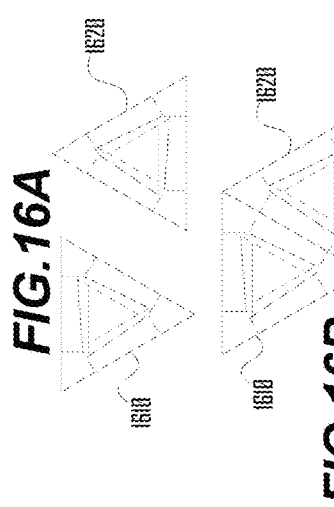
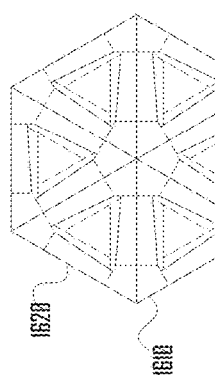
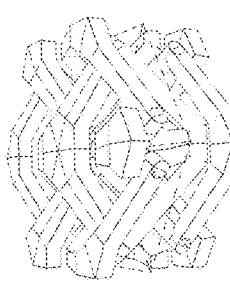
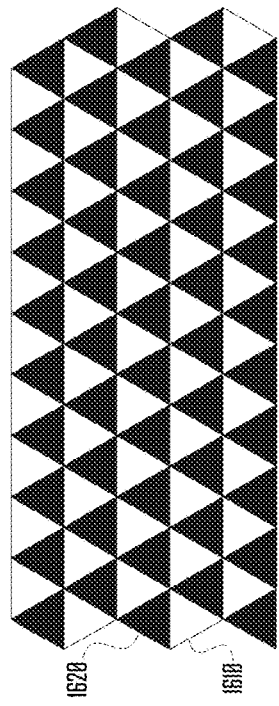
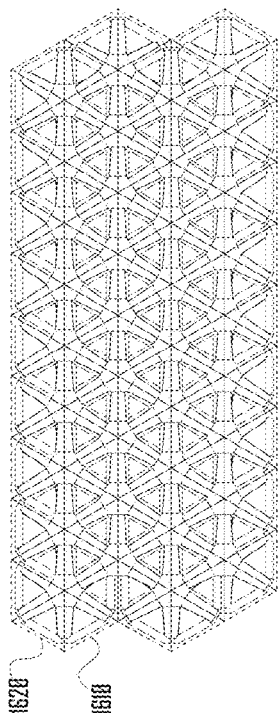
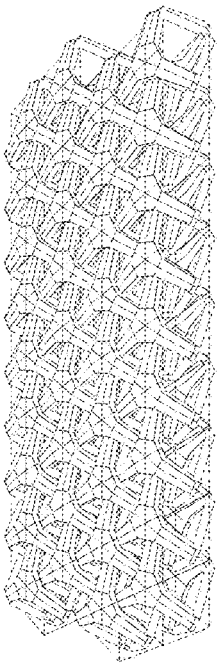
FIG.16A  FIG.16B  FIG.16C  FIG.16D  FIG.16E  FIG.16F  FIG.16G

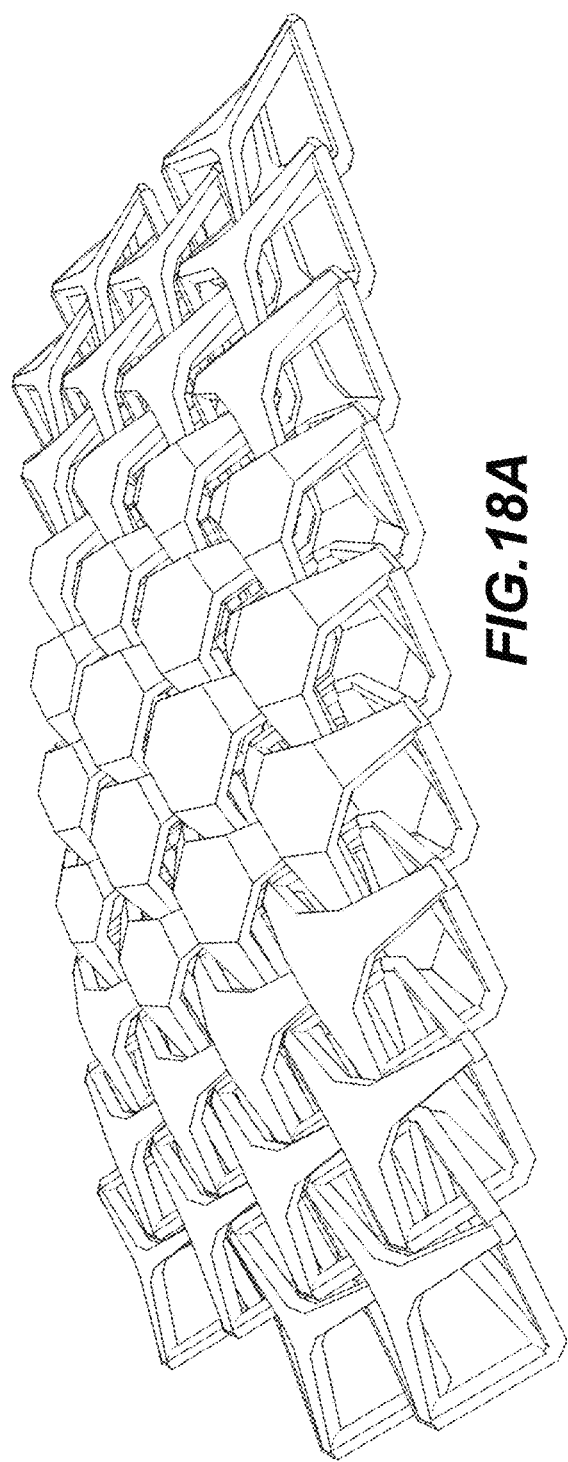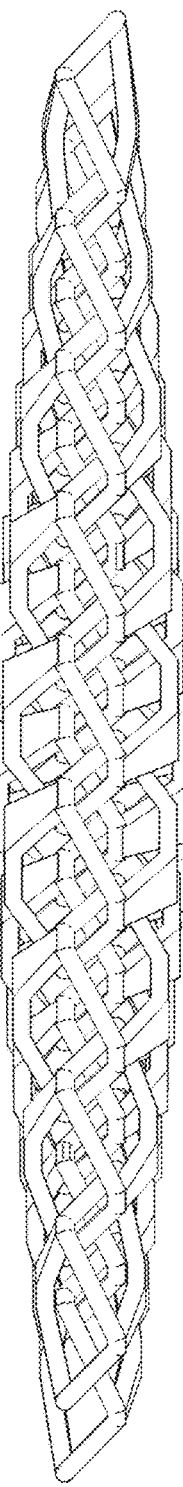
FIG.18A
FIG.18B

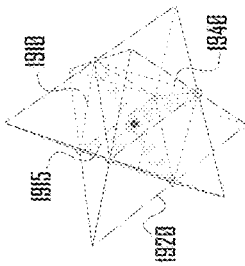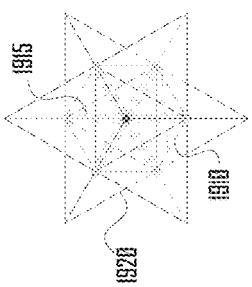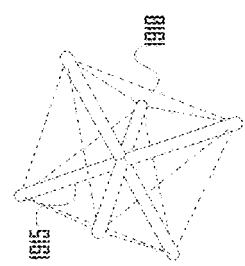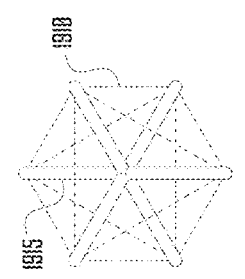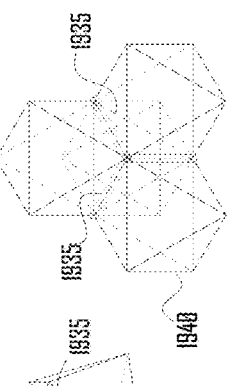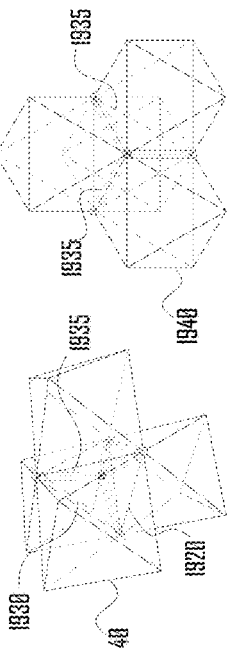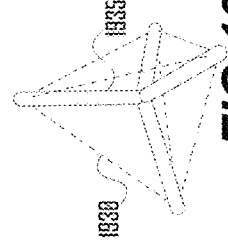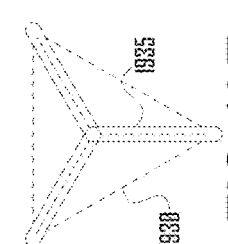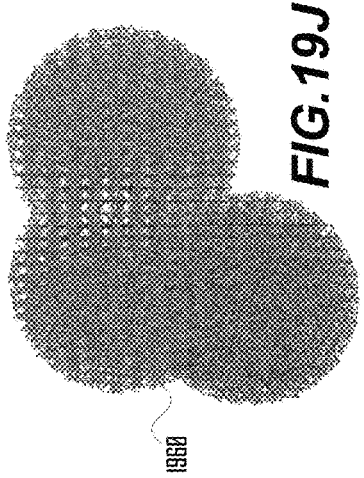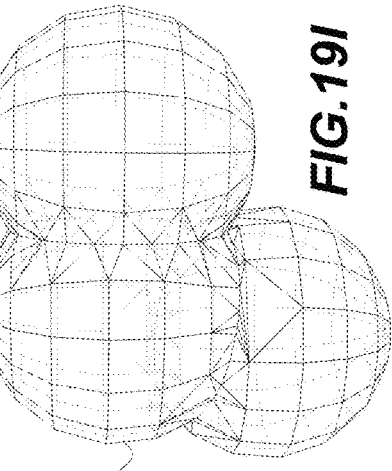

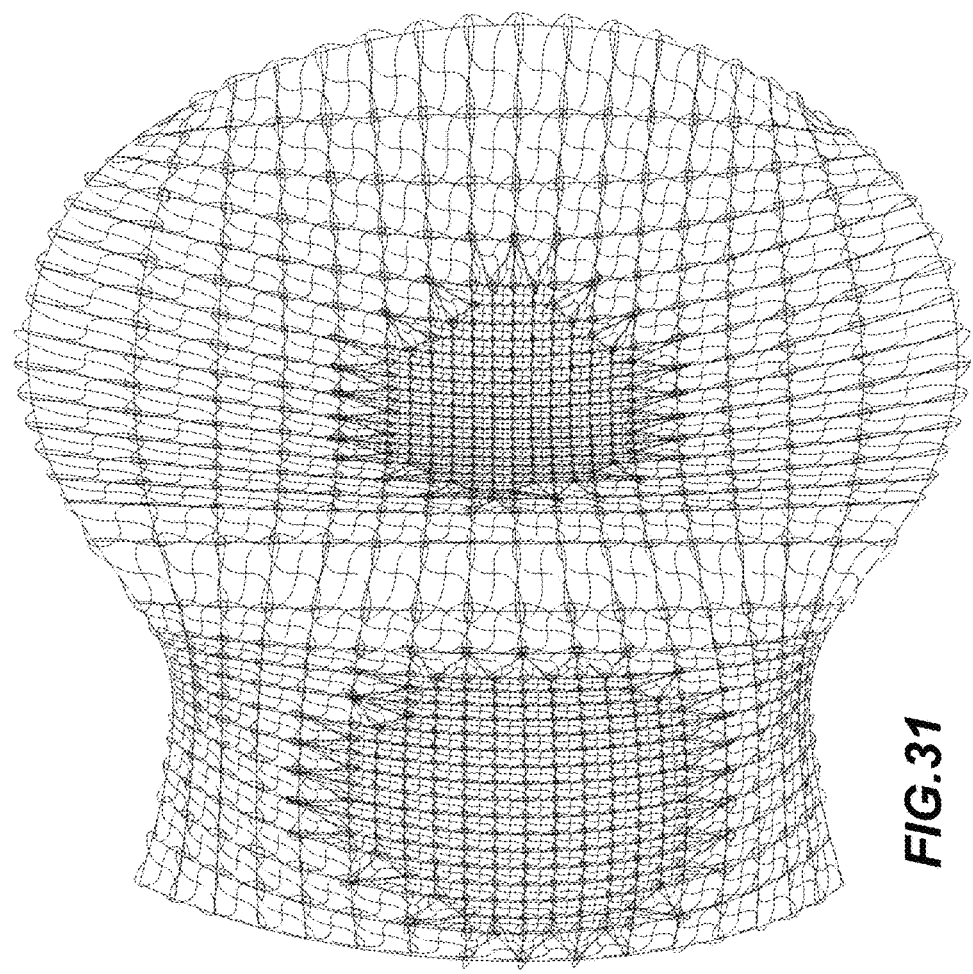
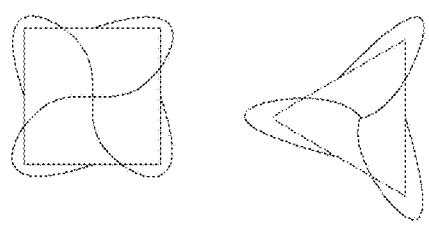
FIG.31

US 10,037,020 B2

SYSTEM AND METHODS FOR CREATING A SEAMLESS MESH EXHIBITING LOCALIZED CUSTOMIZATION TO FILL A MULTIDIMENSIONAL INPUT SURFACE

FIELD

The present disclosure relates to additive manufacturing techniques for generating a 3D printable object. More particularly, to systems and methods for creating a seamless mesh exhibiting localized customization to fill a multidimensional input surface.

BACKGROUND

Traditional manufacturing techniques prefer uniformity in the manufactured goods being produced. Unfortunately, within a product design, specific portions of the design may require variability that would normally preclude use of single-piece manufacturing techniques. Accordingly, a product may be composed of several pieces or components joined together to accommodate these variations. For example, in clothing construction, two or more layers of fabric, plastic, leather, or other materials may be joined together along a seam, which stitches the different components together. Great care is taken during product design with respect to placement (e.g., inseam, center back seam, side seam, etc.) and type (e.g., plain, lapped, abutted, etc.) of the seams used to create a garment that fits properly. The result is a garment with several different component pieces joined together by several seams into a single article of clothing.

Additive manufacturing allow traditionally separate portions of a product to be made without seams or welds. While additive manufacturing techniques can eliminate some of the seams between similar components in a product, some required variability cannot be eliminated by existing techniques that assume fabric uniformity. Moreover, when producing a product using an additive manufacturing process, the product design itself is often changed by the very materials used to manufacture the design. Thus, traditionally, component materials are selected by the manufacturer afterwards to match a desired design. Alternatively, if use of a particular material is desired, the design must incorporate that material from the beginning of the design process. Accordingly, any existing seamless product produced using currently available additive manufacturing techniques is limited to a single material selected for exhibiting properties consistent with the target design.

BRIEF DESCRIPTION OF THE DRAWINGS

The aspects of the present disclosure are best understood from the detailed description when read in relation to the accompanying drawings. The drawings illustrate a variety of different aspects, features, and embodiments of the disclosure, as such it is understood that the illustrated embodiments are merely representative and not exhaustive in scope. The disclosure will now be described with reference to the accompanying drawings, wherein like numbers refer to like elements.

FIG. 7A illustrates a template cell and a textile cell of a triangular base shape in accordance with one embodiment.

FIG. 7B illustrates subdivision of the template cell and the textile cell shown in FIG. 7A in accordance with one embodiment.

FIG. 7C illustrates replication of the template cell and the textile cell shown in FIG. 7A in accordance with one embodiment.

FIG. 7D illustrates replication and subdivision of the template cell and the textile cell shown in FIG. 7A in accordance with one embodiment.

FIG. 8A illustrates a template cell and a textile cell of a square base shape in accordance with one embodiment.

FIG. 8B illustrates subdivision of the template cell and the textile cell shown in FIG. 8A in accordance with one embodiment.

FIG. 8C illustrates replication of the template cell and the textile cell shown in FIG. 8A in accordance with one embodiment.

FIG. 8D illustrates subdivision and replication of the template cell and the textile cell shown in FIG. 8A in accordance with one embodiment.

FIG. 9A illustrates a template cell and a textile cell of a pentagon base shape in accordance with one embodiment.

FIG. 9B illustrates subdivision of the template cell and the textile cell shown in FIG. 9A in accordance with one embodiment.

FIG. 9C illustrates replication of the template cell and the textile cell shown in FIG. 9A in accordance with one embodiment.

FIG. 9D illustrates subdivision and replication of the template cell and the textile cell shown in FIG. 9A in accordance with one embodiment.

FIG. 10A illustrates a template cell and a textile cell of a hexagon base shape in accordance with one embodiment.

FIG. 10B illustrates subdivision of the template cell and the textile cell shown in FIG. 10A in accordance with one embodiment.

FIG. 10C illustrates replication of the template cell and the textile cell shown in FIG. 10A in accordance with one embodiment.

FIG. 10D illustrates subdivision and replication of the template cell and the textile cell shown in FIG. 10A in accordance with one embodiment.

FIG. 12 illustrates an aggregation of textile cells demonstrating an edge interconnection interlocking neighboring textile cells in accordance with one embodiment.

FIG. 16A illustrates variations of a triangular base shape including a textile cell and an inverted textile cell in accordance with one embodiment.

FIG. 16B illustrates a textile cell joined to an inverted textile cell in accordance with one embodiment.

FIG. 16C illustrates a plan view of a hexagon base shape formed from an aggregation of triangular base shapes in accordance with one embodiment.

FIG. 16D illustrates a perspective view of the hexagon base shape shown in FIG. 16C in accordance with one embodiment.

FIG. 16E illustrates a triangular composite mesh using triangle base shapes and inverted triangle base shapes in accordance with one embodiment.

FIG. 16F illustrates a plan view of a hexagon composite mesh formed from the hexagon base shape shown in FIG. 16C in accordance with one embodiment.

FIG. 16G illustrates a perspective view of the hexagon composite seamless mesh shown in FIG. 16F in accordance with one embodiment.

FIG. 18A illustrates a perspective view of the seamless mesh shown in FIG. 17C in accordance with one embodiment.

FIG. 18B illustrates a side view of the seamless mesh shown in FIG. 18A in accordance with one embodiment.

FIG. 19A illustrates a plan view of an octahedral base shape in accordance with one embodiment.

FIG. 19B illustrates a perspective view of the octahedral base shape in FIG. 19A in accordance with one embodiment.

FIG. 19C illustrates a plan view of a volumetric replication of the octahedral base shape shown previously in FIG. 19A and eight tetrahedral base shapes shown previously in FIG. 19E in accordance with one embodiment.

FIG. 19D illustrates a perspective view of a volumetric replication of the octahedral base shape shown previously in FIG. 19A and eight tetrahedral base shapes shown previously in FIG. 19E in accordance with one embodiment.

FIG. 19E illustrates a plan view of a tetrahedral base shape in accordance with one embodiment.

FIG. 19F illustrates a perspective view of the tetrahedral base shape in FIG. 19E in accordance with one embodiment.

FIG. 19G illustrates a plan view of a volumetric replication of the tetrahedral base shape shown in FIG. 19E and four octahedral base shapes shown in FIG. 19A in accordance with one embodiment.

FIG. 19H illustrates a perspective view of a volumetric replication of the tetrahedral base shape shown in FIG. 19E and four octahedral base shapes shown in FIG. 19A in accordance with one embodiment.

FIG. 19I illustrates a perspective view of a volumetric space of an input shape that includes three overlapping spheres in accordance with one embodiment.

FIG. 19J illustrates a perspective view of a seamless mesh of the input shape in FIG. 19I in accordance with one embodiment.

FIG. 31 illustrates a top view the mesh using multiple base shapes in accordance with one embodiment.

DETAILED DESCRIPTION

Figure 1:
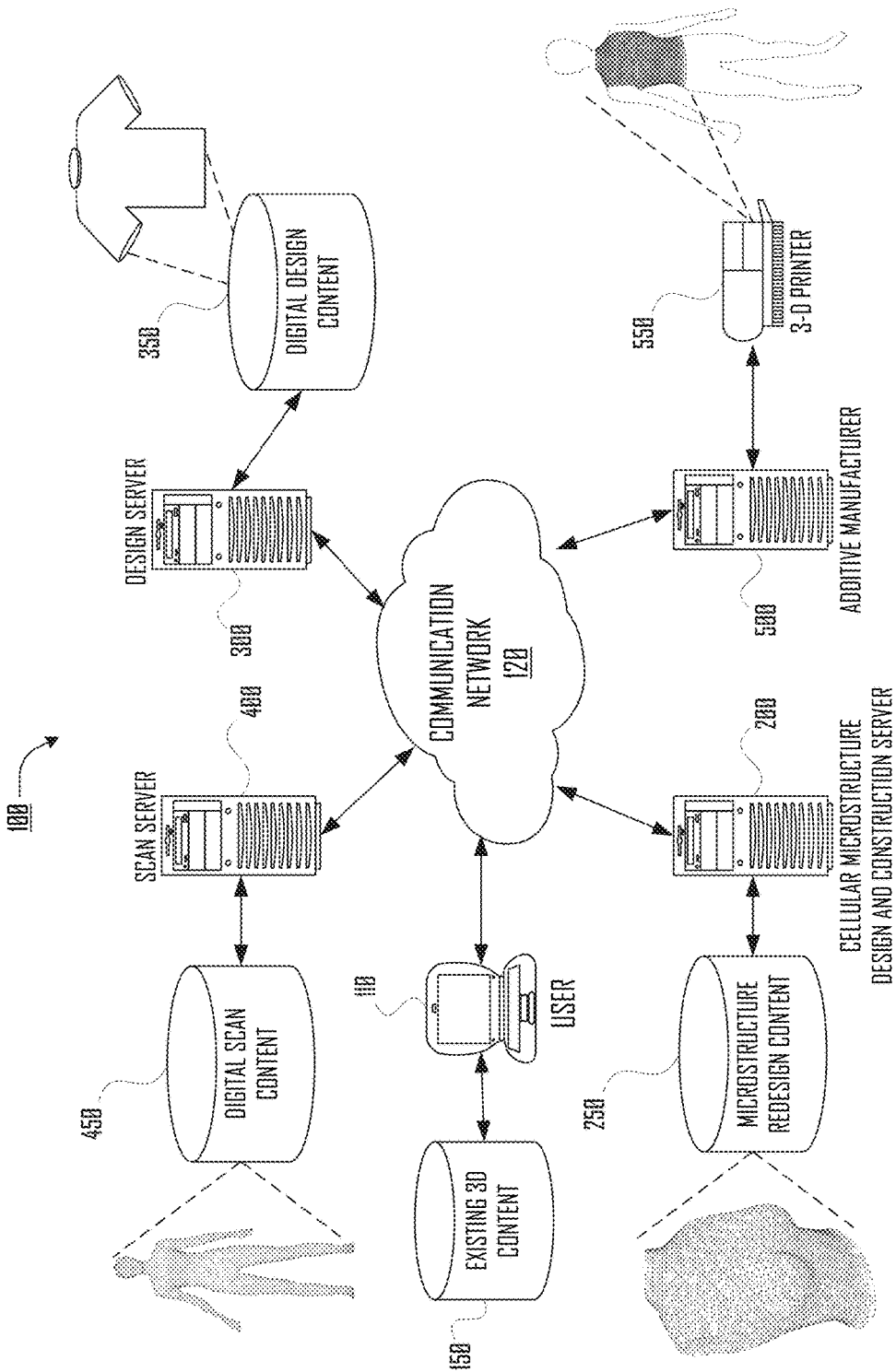
FIG. 1 illustrates a suitable dynamic cellular microstructure design and construction environment wherein designs with attractor points may be applied to available scans with curvature data and retopologized for application to an additive manufacturing construction in accordance with at least one embodiment.

In accordance with various embodiments of the invention, dynamic cellular microstructure construction systems and methods are described that overcome the hereinafore-mentioned disadvantages of the heretofore-known additive manufacturing methods and systems of this general type and that provide for customization in localized areas of a seamless mesh. More specifically, the described embodiments provide a seamless mesh generated from an input shape, based on available scans and/or surface designs, and supplemented with curvature data derived from the input shape. Redesign of a base shape and/or group of base shapes within a seamless mesh enable customization in localized areas of the seamless mesh. The seamless mesh may also be retopologized according to localized feature attractor points. Base shape redesign includes cellular replication, subdivision, growth, and/or modification to adjust variable material properties. Modification changes relative opacity, stretch, drape, compressive strength, plasticity, yield strength, resilience, and Poisson's ratio specific to geometry of a base shape. Each base shape can also exhibit modifiable isotropic or anisotropic properties.

In some embodiments, a method of manufacturing a seamless mesh may include obtaining at least one 3-D scan of a 3-D surface and/or a surface design to be at least partially covered by the seamless mesh, demarcating a portion of the obtained 3-D scan and/or surface design as an input shape for the seamless mesh, identifying at least one base shape for use in creating the seamless mesh on the input shape, replicating the at least one base shape to cover the input shape with replicated base shapes that form the seamless mesh, and/or modifying the at least one base shape in localized areas of the seamless mesh based on relative proximity curvature of the input shape. In some embodiments, the modifying the base shape may include changing at least one of opacity, thickness, stretch, drape, and size of the base shape. In one embodiment, the base shape represents a combination of material (textile) and rules (template). Modifications to the base shape can produce variable material properties. For example, parts of the base shape can thicken or thin, new connections can be added or removed within the base shape, and the method a base shape connects to its neighbor can change from interlocking to interconnecting. These changes can also alter a material's opacity, stretch, drape, as well as the final materials yield strength, Poisson's ratio, and/or compressive strength. The chosen base shape can also have isotropic or anisotropic properties, where isotropic properties of a base shape are the same in all orientations and anisotropic properties exhibit different properties depending on the orientation of the base shape.

In some embodiments, the base shape is a space filling polyhedral. For example, depending on the desired application, a base shape may be 2D and/or 3D (polygon/polyhedron). The template shape of a base shape can be a 2-D space filling polygons, such that they create a tessellation over the input shape, or a 3-D space filling polyhedron filling the input space. In one embodiment, the 3D Textile cells are mapped to the 2-D shapes. In another embodiment, 3D textile cells can also be mapped to 3D space filling polyhedra, this allows for a volumetric lattice, which can fill a volume defined by the boundaries of an input surface.

In some embodiments, the replicating the base shape may include identifying at least one vertex of an original base shape, generating at least one additional base shape and rotating placement of the generated at least one additional base shape about the at least one vertex of the original base shape, upon placement of the at least one additional base shape about the original base shape continuing replication of the base shape using the at least one additional base shape as the new original base shape until the at least one additional base shape reaches an edge of the input surface.

In some embodiments, the at least one base shape is interlocked with at least one additional replicated base shape. In some embodiments, the at least one base shape and at least one additional replicated base shape are joined along at least one edge of the base shape. In some embodiments, the at least one base shape partially overlaps with at least one neighboring base shape. In some embodiments, the at least one 3-D scan of a 3-D surface is a 3-D model. In some embodiments, the surface design is independent of the at least one 3-D scan of the 3-D surface and may further include modifying the surface design to cover the 3-D surface based on the 3-D scan. In some embodiments, the surface design may include identification of relative design parameters desirable for the seamless mesh. In some embodiments, the design parameters may include opacity, thickness, stretch, drape, and size. In some embodiments, the surface design is an article of clothing. In some embodiments, such a method may further include printing the seamless mesh using additive manufacturing techniques. In some embodiments, the identifying the at least one base shape for the mesh may include identifying different base shapes based on the surface design. For example, when mapping the base shape to the input shape, template cells of a base shape can subdivide in areas of high curvature, to allow the material to better approximate the shape. Similarly, an alternative template cell (e.g., switching from a square to triangle) may be substituted for the base shape to allow the material to better approximate the shape.

In one embodiment, the described technology may be used to produce textiles that can be customized to the needs and desires of the purchaser. In particular, the described technology can produce textiles using 3D printing that allow for the generation of textiles in multiple dimensions. One can adjust the geometry of the weave of the specific textile and manipulate that geometry to have different formative qualities throughout a garment. With data from a multidimensional scan, one can customize a garment to the specific shape of the wearer in a variety of positions. More specifically, the invention allows for textiles to be generated with multiple properties throughout. By "growing," a weave using the fractal mathematics, the weave is able to variably thicken throughout a textile as well as vary in density and size. This allows for a textile to take on multiple formative characteristics throughout a garment. Also, the described technology allows for the growth of a custom textile around a person, based on the input of 3D scanned data about that person. For example, a generated weave can be based off of the triangle and quad data from a .stl mesh file from a 3D scan. The resulting weave can then stretch, warp, and subdivide to allow for the design to accommodate more or less flexibility depending on the garment design parameters. In one embodiment, these weaves are combined to create a multi-dimensional interlocking matrix that forms a seamless mesh.

In the following detailed description, reference is made to the accompanying drawings which form a part hereof wherein like numerals designate like parts throughout, and in which are shown, by way of illustration, specific embodiments in which the disclosure may be practiced. Various aspects of the illustrative embodiments will be described using terms commonly employed by those skilled in the art to convey the substance of their work to others skilled in the art. However, the embodiments described herein may be practiced with only some of the described aspects. For purposes of explanation, specific numbers, materials, and configurations may be set forth to provide a thorough understanding of the illustrative embodiments. However, the embodiments described herein may be practiced without the specific details. In other instances, well-known features are omitted or simplified in order not to obscure the illustrative embodiments. Further, various operations and/or communications may be described as multiple discrete operations and/or communications, in turn, in a manner that may be helpful in understanding the embodiments described herein; however, the order of description should not be construed as to imply that these operations and/or communications are necessarily order dependent. In particular, these operations and/or communications need not be performed in the order of presentation.

The detailed description that follows is represented largely in terms of processes and symbolic representations of operations by conventional computing components, including a processor, memory storage devices for the processor, connected display devices and input devices. Furthermore, these processes and operations may utilize conventional computing components in a distributed computing environment; including remote file servers, servers, publishing resources, and/or memory storage devices. Each of these conventional distributed computing components is accessible by the processor via a network. In a distributed computing environment, clients, servers, and client/servers may be, for example, smartphones, mainframes, minicomputers, workstations, or personal computers. Most services in a distributed computing environment can be grouped into distributed file system, distributed computing resources, and messaging. A distributed file system provides a client with transparent access to part of the mass storage of a remote network device, such as a network-attached storage (NAS) or file-level computer data storage server. Distributed computing resources provide a client with access to computational or processing power of remote network devices, such as a cloud server. Messaging allow a client to manage the exchange of data and information between other device connected to the network. It is to be understood that other embodiments may be utilized and structural or logical changes may be made without departing from the scope of the present disclosure. Therefore, the following detailed description is not to be taken in a limiting sense, and the scope of a portion of the present disclosure is defined by the claims and appended drawings and their equivalents.

Throughout the specification and drawings, the following terms take at least the meanings explicitly associated herein, unless the context clearly dictates otherwise. The meanings identified below are not intended to limit the terms, but merely provide illustrative examples for use of the terms. The meaning of "a," "an," and "the" may include reference to both the singular and the plural. Reference in the specification to "one embodiment" or "an embodiment" means that a particular feature, structure, or characteristic described in connection with the embodiment is included in at least one embodiment of the disclosure, but are not necessarily included on all embodiments of the disclosure. The meaning of "in" may include "in" and "on." The phrases "in one embodiment" or "in an embodiment" or "in various embodiments" or "in some embodiments" and the like are used repeatedly. Such phrases in various places in the specification do not necessarily all refer to the same embodiment, but it may unless the context dictates otherwise. The terms "comprising", "having", and "including" should be considered synonymous, unless context dictates otherwise. The phrase "A/B" means "A and/or B" or "A or B" depending on context. The phrase "A and/or B" means "(A), (B), or (A and B)". The phrase "at least one of A, B, and C" means "(A), (B), (C), (A and B), (A and C), (B and C) or (A, B and C)". The phrase "(A) B" means "(A B) or (B)", that is "A" is optional. The use of any of these phrases does not imply or indicate that the particular feature, structure, or characteristic being described is a necessary component for every embodiment for which such a description is included.

The terms "3D scan" and "3D surface" may or may not be used interchangeably depending on context and typically refer to a method to capture a three dimensional representation of an object. More specifically, the term "3D scan", without additional context, refers to a method to capture three dimensional points in the real world through a device, such as a camera/scanner that can understand height, width and depth of an object being scanned and may also identify other parameters of the scanned object including color. A reconstruction of the space that is scanned is possible by generating a mesh from these points. Comparatively, the term "3D surface" may refer to a two-dimensional topological manifold in 3-D space. Each point on the surface can be represented by a two-dimensional coordinate. Surfaces can be open, and have a boundary (ex. A plane), or closed (ex. A sphere). The term "input shape" refers to a 3D shape with any topology that is input either from an existing 3d model or is created from 3D scan data. Similarly, the term "base shape" refers to the combinational pair of a template cell and a textile cell, where the template cell has rules for growth and the textile cell gets updated parametrically based on the paired template cell.

The term "cover" typically refers to the process of multiplication, subdivision, substitution, and/or removal of a plurality of interconnected/interlocked base shapes onto a seamless mesh to distribute the mesh over the entire input shape. The terms "joined", "interconnected", and "interlocked" may or may not be used interchangeably depending on context and typically refer to methods of connecting individual cells and/or base shapes with each other. More specifically, the term "interlocked" refers to when two textile unit cells are knotted together, but not touching. The two textile unit cells cannot be pulled apart from one another, but the cells are free to move independently of each other along at least one axis. Interlocking may include interlocking portions, interconnected portions, and/or some combination of these. The term "interconnected" refers to when two textile unit cells are joined together and at that joint, movement is restricted in all axes. However, bending is possible. For example, spring-like connections can be interconnected. The term "joined" when used with reference to a project may refer to multiple designs that are brought together into a single project and are modified based on parameters of that project. The term "joined" when used with reference to an edge may refer to a situation when interconnecting/interlocking happens at an edge then neighboring cells are joined at the edge, alternatively if interlocking happens within a cell then each cell extends into neighboring cell to interlock.

The term "attractor point" refers to a point placed anywhere on the input shape. A value can be taken based on the distance from any point on the input shape to the attractor point's location. These values can be input into the scalar field that is created for the input shape. The term "curvature" typically refers to the measure of a rate of change in direction of a surface, which can often be measured by taking the reciprocal of the radius of the best fitting circle to the curve or surface at a point. Both curvature and attractor points may be used to identify localized areas of the seamless mesh subject to redesign. Base shape redesign may include cellular replication, subdivision, growth, and/or modification to adjust variable material properties. Modification changes relative opacity, stretch, drape, compressive strength, plasticity, yield strength, resilience, and Poisson's ratio specific to geometry of a base shape. For example, changing thickness and size of a base shape may have an effect on the overall design. More specifically, adding thickness usually increases strength, so a design that needs to be stronger in a particular location might thicken the base shape within that local area. Each base shape can also exhibit modifiable isotropic or anisotropic properties. In a unique orthotropic case, three perpendicular axis of a seamless mesh may exhibit three different behaviors/properties.

The terms "matrix", "lattice", "shell", and "mesh" may or may not be used interchangeably depending on context and typically refer to either a surface or structure readily recognized as a Cartesian way of representing object geometry using vertices, edges, and faces. A vertex has a specific Cartesian coordinate in relative space, edges connect any two vertices, and a face represents a closed set of edges. Usually each face consists of triangles or quadrilaterals, but any number of sides greater than three is possible. These terms may also refer to an openwork fabric, structure; a net, or network where individual cords, threads, or wires surrounding the spaces cover an input shape. The terms "remote" and "local" generally are not interchangeable and specifically reference to two distinct devices, but may not necessarily describe relative proximity depending on context. For example, items may be stored on a local client datastore and a remote server datastore, but the local datastore may actually be farther away if the local client datastore is actually maintained in cloud storage associated with the client.

Reference is now made in detail to the description of the embodiments as illustrated in the drawings. Particular embodiments described in this application provide specific case implementations of dynamic cellular microstructure construction systems with customization in localized areas of a generated seamless mesh. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

Referring to FIG. 1, a suitable dynamic cellular microstructure design and construction environment 100 is shown wherein designs with attractor points may be applied to available scans with curvature data and retopologized for application to an additive manufacturing construction in accordance with at least one embodiment. In the environment 100, communications network 120 connects a user client device 110 with an existing 3D content datastore 150, a cellular microstructure design and construction server 200 with a microstructure redesign content datastore 250, a design server 300 with a digital design content datastore 350, a scan server 400 with a digital scan content datastore 450, and an additive manufacturer 500 with a 3-D printer 550. In one embodiment, the existing 3D content datastore 150 includes user maintained scans, images, product designs, and content links. In one embodiment, the microstructure redesign content datastore 250 includes cellular microstructures, attractor point modifications, and a content library of materials, designs, styles, and cell/unit microstructures. In one embodiment, the design content datastore 350 includes a content library of materials, designs, styles, and cell/unit microstructures. In one embodiment, the scan content datastore 450 includes scans, images, and a content library of materials, designs, styles, and cell/unit microstructures.

In one embodiment, a user client device 110 may request production of a customized shirt. The user may identify the desired shirt design on the existing local 3D content datastore 150 or on a remote digital design content datastore 350. The cellular microstructure design and construction server 200 receives the desired design and may request an associated user scan to customize construction. The user scan may already be available on the existing local 3D content datastore 150 of the user or on a remote digital scan content datastore 450. Alternatively, in one embodiment, a user may generate a new scan via scan services provided by the scan server 400, which may include use of a 3D scanner, camera, and/or submission of user images or video to the scan server.

The cellular microstructure design and construction server 200 or design server 300 selectively accessing available design projects and optionally joining the digital representation of the 3-D surface with at least one design project, the at least one design server conforming each of the joined design projects to the 3-D surface by identifying a plurality of areas of curvature on the 3-D surface and modifying correlating areas of the joined design projects. In one embodiment, modification may change relative opacity, stretch, drape, compressive strength, plasticity, yield strength, resilience, and Poisson's ratio specific to geometry of a base shape within the design to conform with desired design parameters. Accordingly, localized modification can occur to the materials and/or rules associated with designated base shapes identified within the target area, so that modifications may be made consistent with desired outcome. In one embodiment, the borders of each of the areas of curvature representing a virtual seam within the seamless mesh. Alternatively, the modification effects taper axially from an attractor point.

Additional features of the distributed emoji datastore 300 are shown in greater detail in FIG. 4 below. In various embodiments, communication network 120 may include the Internet, a local area network ("LAN"), a wide area network ("WAN"), a wireless data network, a cellular data network, and/or other data network. Moreover, it is understood by those of skill in the art that the communication network 120 may also include any combination of the above.

In some embodiments, other servers and/or devices (not shown) may also be present. Including one or more intermediary application servers and/or platform-provider servers may also be present. For example, in one embodiment, multiple additional client devices and/or non-client devices may be present. Similarly, in one embodiment, multiple design content publishers may also be available to the user to select their desired design. Similarly, a variety of local and remote additive manufacturers may also be present to produce the final product. In various embodiments, the scan server, design server, cellular microstructure design and construction server, additive manufacturer, or some combination of these servers are combined to represent themselves as a single entity to the user. Alternatively, the user may believe selecting a clothing design, scanning the target, customizing the design to the user's target, and printing the customized design are all performed by distributed computing resources controlled by a single entity when each portion is independently maintained.

Figure 2:
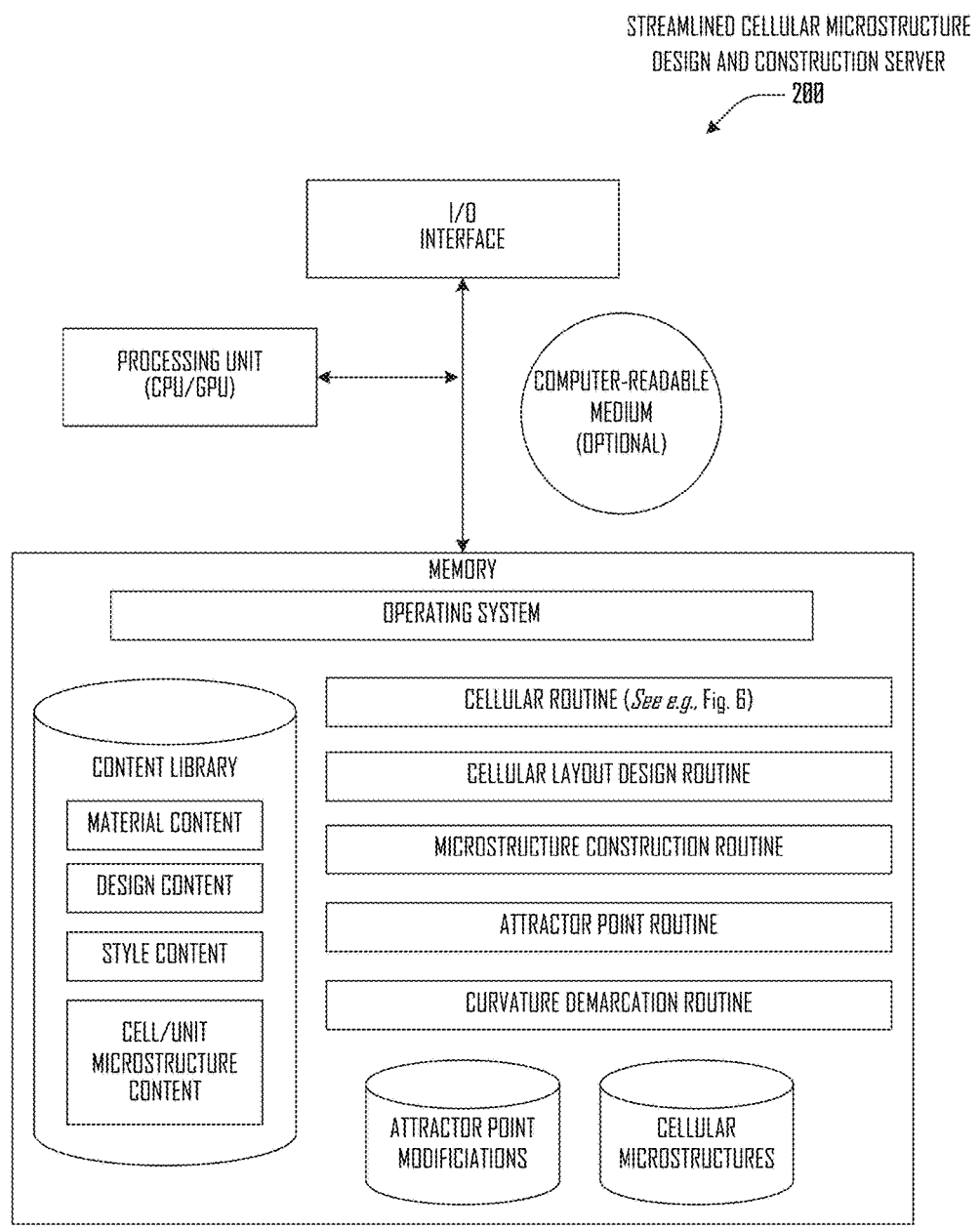
FIG. 2 illustrates several components of a cellular microstructure design and construction server in accordance with one embodiment.

Referring now to FIG. 2 several components of a cellular microstructure design and construction server 200 are shown in accordance with one embodiment. As shown in FIG. 2, the cellular microstructure design and construction server 200 includes a network I/O communication interface 230 for connecting to the communication network 120. The cellular microstructure design and construction server 200 also includes one or more processors collectively represented as a processing unit 210, and memory 250, all interconnected along with the network I/O communication interface 230 via a communication bus 220. The memory 250 generally comprises a random access memory ("RAM"), a read only memory ("ROM"), and a permanent mass storage device, such as a disk drive, flash device, or the like. The memory 250 stores program code for a number of applications, which includes executable instructions for cellular routine 600 (see FIG. 6, discussed below), cellular layout design routine, and microstructure construction routine. As shown in FIG. 2, the memory 250 also includes an attractor point modification datastore, a cellular microstructure datastore, and a content library datastore. In one embodiment, the content library datastore also includes material content, design content, style content, and cell/unit microstructure content. In one embodiment, the content library datastore is distributed within the environment 100. In addition, the memory 250 also stores an operating system 255. These software components may be loaded from a computer readable storage medium 295 into memory 250 of the cellular microstructure design and construction server 200 using a read mechanism (not shown) associated with a non-transient computer readable storage medium 295, such as a floppy disc, tape, DVD/CD-ROM drive, memory card, or the like. In at least one embodiment, software components may also be loaded via the network I/O communication interface 230, rather than via a computer readable storage medium 295. In some embodiments, the cellular microstructure design and construction server 200 may include many more components than those shown in FIG. 2. However, it is not necessary that all of these generally conventional components be shown in order to disclose an illustrative embodiment.

Although a particular cellular microstructure design and construction server 200 has been described that generally conforms to conventional general purpose computing devices, the cellular microstructure design and construction server 200 may be any of a great number of network devices capable of communicating with the communications network 120 and obtaining applications, for example, mainframes, minicomputers, workstations, personal computers, or any other suitable computing device. In some embodiments, some or all of the systems and methods disclosed herein may also be applicable to distributed network devices, such as cloud computing, and the like. Available cloud resources may include applications, processing units, databases, and file services. In this manner, the cellular microstructure design and construction server 200 enables convenient, on-demand network access to a shared pool of configurable design content and related computing services and resources (e.g., networks, servers, storage, applications, and services) that can be rapidly provisioned and released with minimal management effort or service provider interaction. These services may be configured so that any computer connected to the communications network 120 is potentially connected to the group of cellular microstructure design and construction applications, processing units, databases, and files or at the very least is able to submit design requests, customize manufacturing, and/or localized content parameter designations. In this manner, the data maintained by cellular microstructure design and construction server 200 and/or microstructure redesign content datastore 300 may be accessible in a variety of ways by various user client devices 110, for example, a digital tablet, a personal computer, a portable scanner, a handheld computer, a cell phone, or any other device that is capable of accessing the communication network 120.

Figure 3:
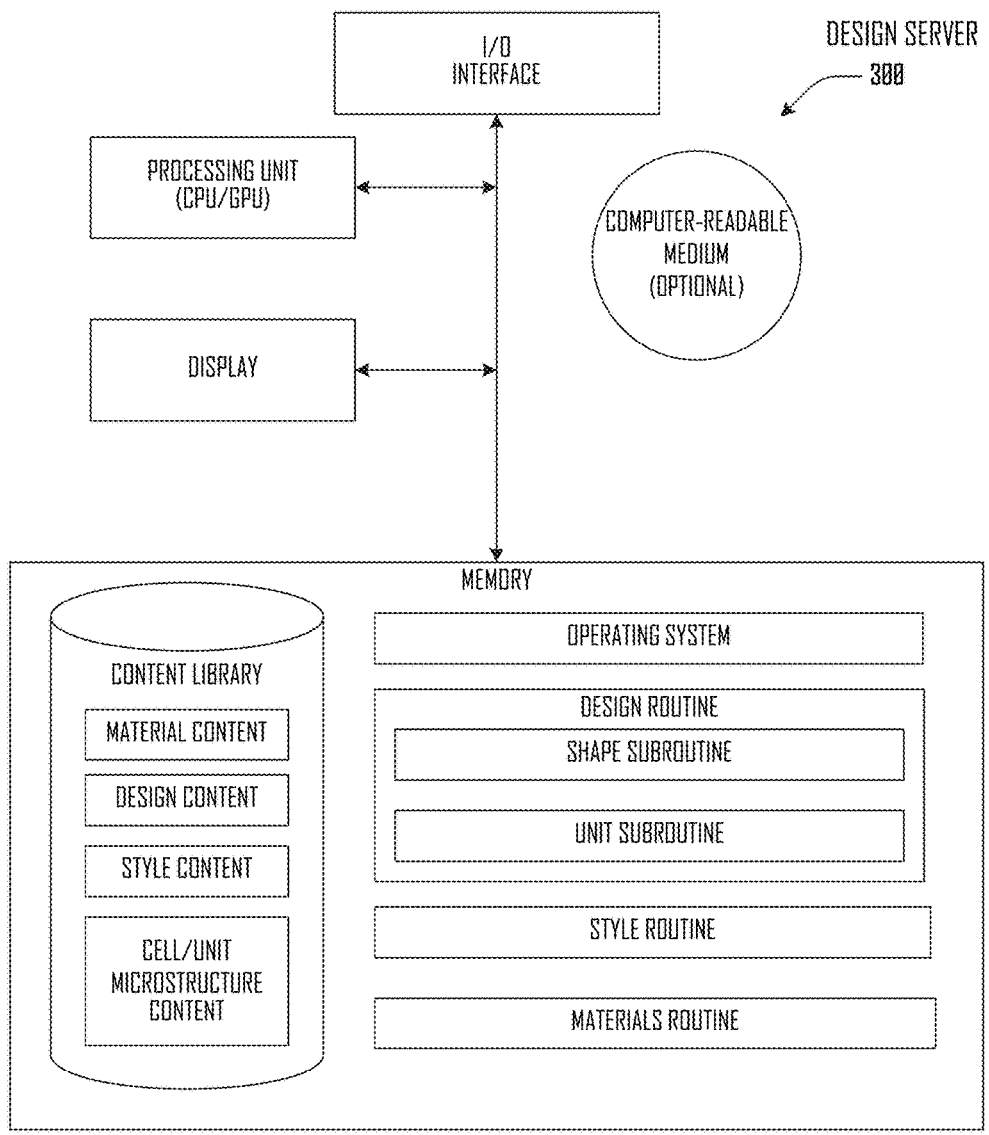
FIG. 3 illustrates several components of a design server in accordance with one embodiment.

Referring to FIG. 3, several components of a design server are shown in accordance with one embodiment.

Figure 4:
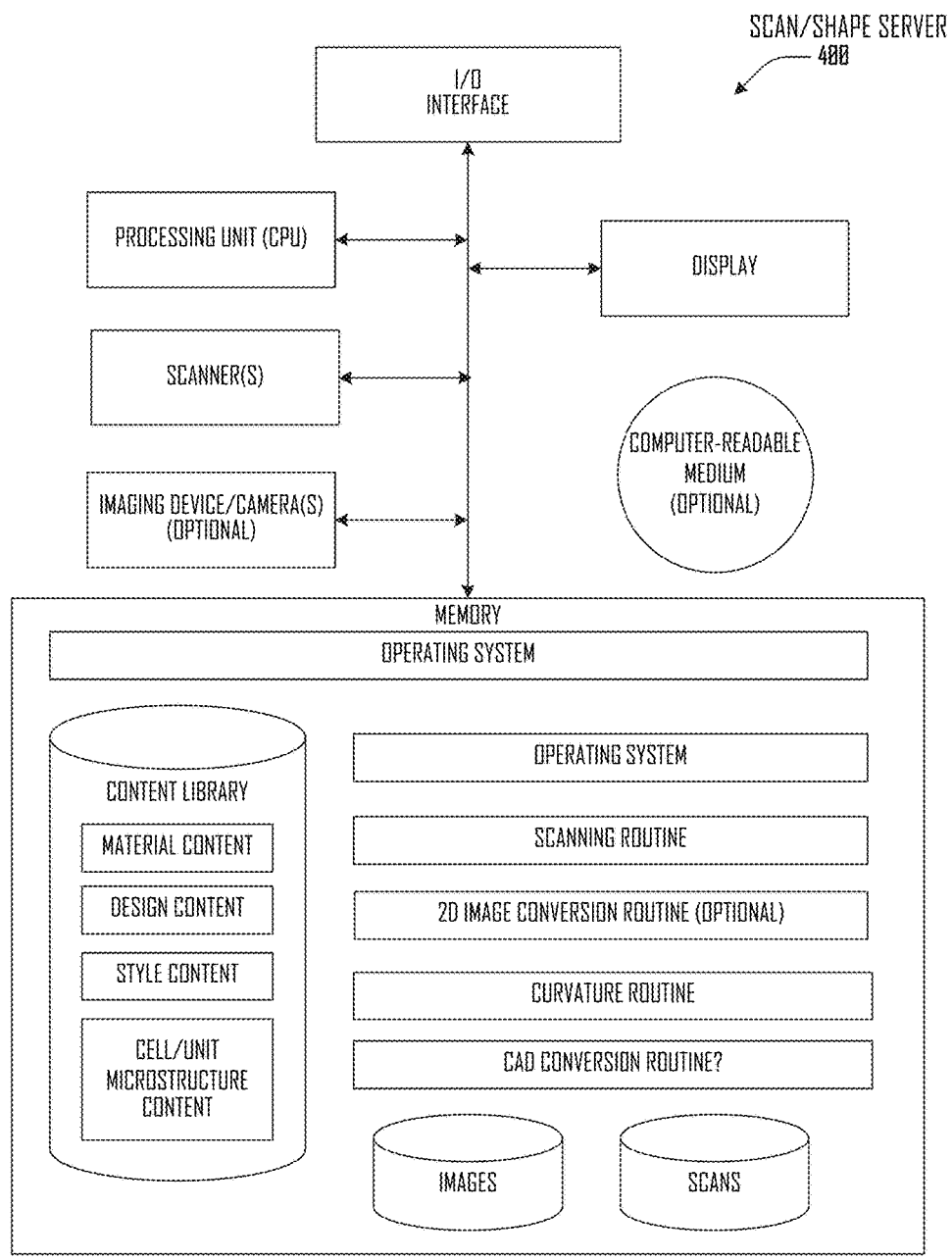
FIG. 4 illustrates several components of a scanner server in accordance with one embodiment.

Referring to FIG. 4, several components of a scanner server are shown in accordance with one embodiment.

Figure 5:
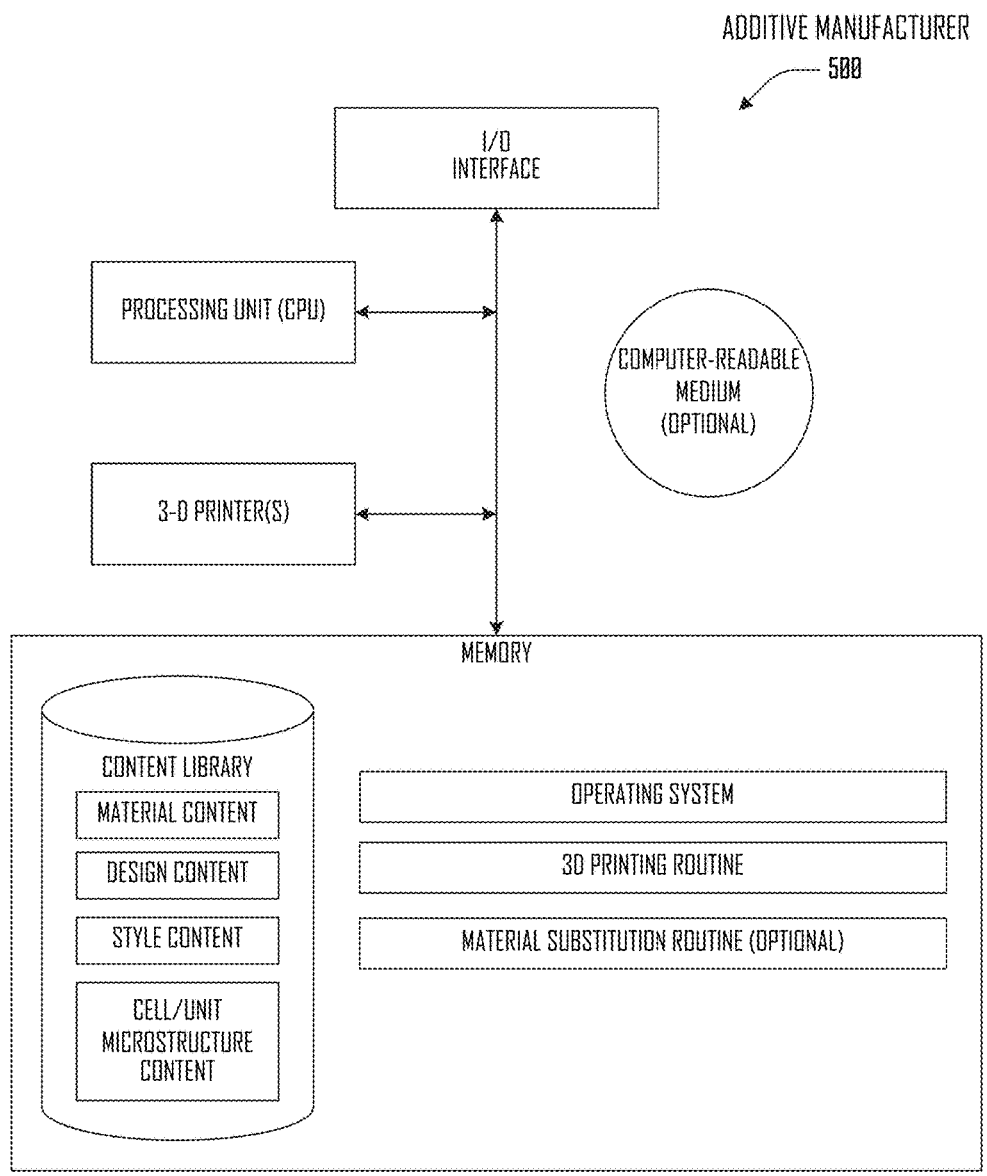
FIG. 5 illustrates several components of an additive manufacturer for 3D printing shown in accordance with one embodiment.

Referring to FIG. 5, several components of an additive manufacturer for 3D printing are shown in accordance with one embodiment.

Figure 6:
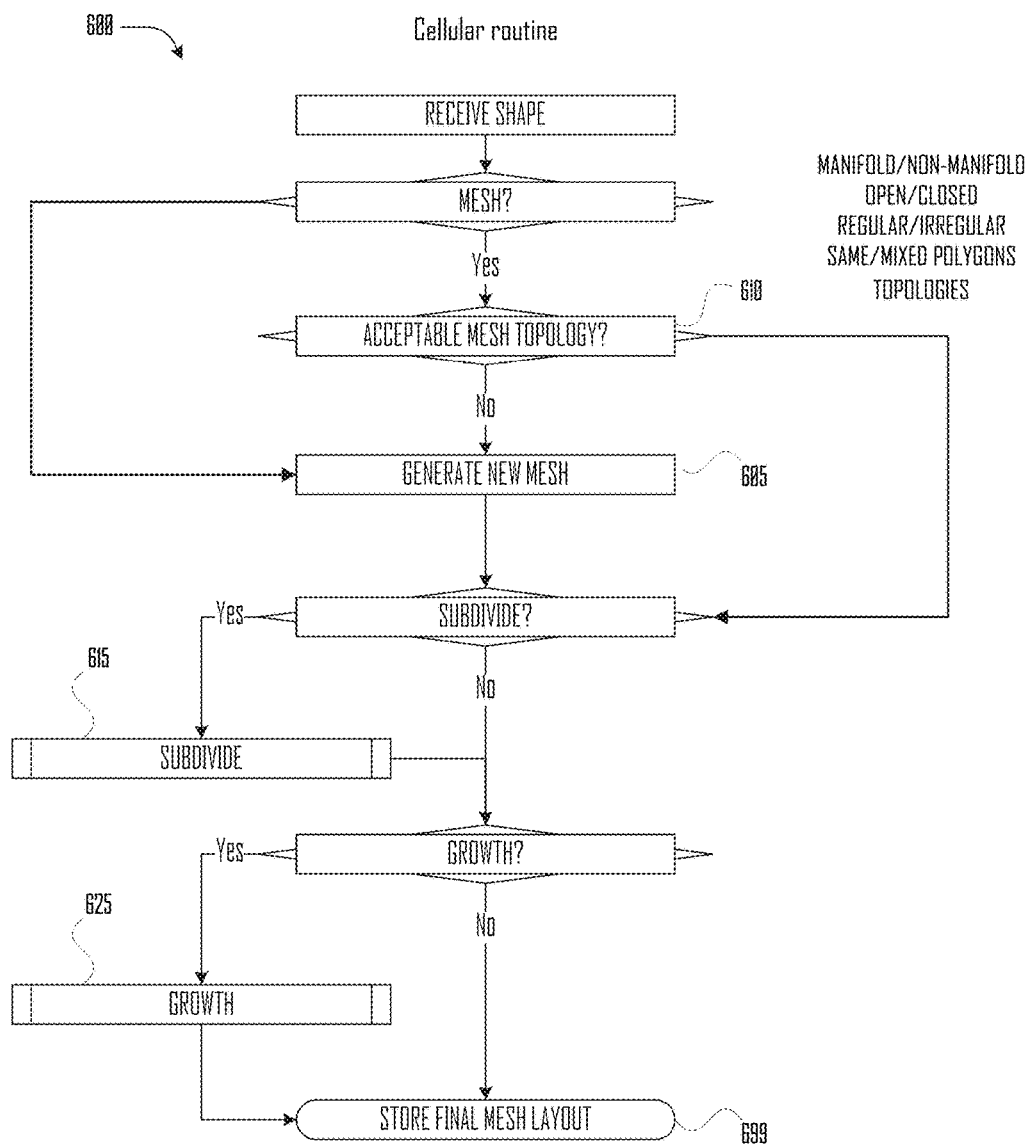
FIG. 6 illustrates a flow diagram of a cellular microstructure design/seamless mesh production routine for the seamless mesh server shown in FIG. 2 in accordance with one embodiment.

Referring to FIG. 6, a flow diagram of a cellular microstructure design/seamless mesh production routine 600 for the seamless mesh server 200 are shown in accordance with one embodiment.

Referring now to FIG. 7A, a template cell 710 and a textile cell 715 of a triangular base shape are shown in accordance with one embodiment. The illustrated textile cell 715 combines three interlocking 3D loops, each loop associated with a different vertex of the underlying template cell 710. Each loop extends from the vertex past the midpoint of the opposite edge of the underlying template cell 710.

Referring now to FIG. 7B, subdivision of the template cell 710, shown previously in FIG. 7A, is shown for both the template cell 720 and the textile cell 725 in accordance with one embodiment. During subdivision, the original template cell 710 of the triangular base shape is copied at each vertex. The copies are scaled down (e.g., 50%) from their respective vertex. The original template cells are also scaled down from the centroid and rotated 180 degrees. The scaled combination of original and copied template cells creates the subdivided template cell 720 with four reduced template cells. Textile cell 725 replaces the three reduced template cells with three interlocking textile cells, each being similar to the textile cell 715, shown previously in FIG. 7A.

Referring now to FIG. 7C, replication of the template cell 710 and the textile cell 715, shown previously in FIG. 7A, of a triangular base shape is shown for both template cell 730 and textile cell 735 in accordance with one embodiment. During replication, the original template cell 710 of the triangular base shape is copied and rotated about one vertex until a different replicated template cell lines up with both adjacent edges of the original template cell. Any base shape template cell can replicate in this manner. In the illustrated case, before replicating around the original vertex is complete, the sum of the angles of each triangular template cell meeting at the original vertex must equal 360 degrees. In one embodiment, replication may continue by copying the original template cell 710 and rotating about another vertex until the original template cell is completely surrounded by copied template cells. Once the original template is surrounded, any outer template cells that are not surrounded may become new original template cells for a next generation of replication.

Referring now to FIG. 7D, replication and subdivision of the template cell 710 and the textile cell 715, both shown previously in FIG. 7A, of a triangular base shape is shown for both the template cell 740 and the textile cell 745 in accordance with one embodiment. During replication, the original template cell 710 of the triangular base shape is copied and rotated about one vertex until a copied template cell is on both sides of the original template cell 710. The original template cell 710 and each of the copied template cells is then subdivided, as shown previously in FIG. 7B. In one embodiment, the original template cell 710 is subdivided first and then replicated.

Referring now to FIG. 8A, a template cell 810 and a textile cell 815 of a quadrilateral base shape are shown in accordance with one embodiment. The illustrated textile cell 815 combines four different 3D interlocking loops, each loop associated with a different midpoint of an edge of the underlying template cell 810. Each loop extends around the associated midpoint and around a centroid of the underlying template cell 810.

Referring now to FIG. 8B, subdivision of the template cell 810, shown previously in FIG. 8A, is shown for a template cell 820 and a textile cell 825 in accordance with one embodiment. During subdivision, the original template cell 810 of the quadrilateral base shape is copied at each vertex. The copies are scaled down from their respective vertex. The scaled copied template cells create the subdivided template cell 820 with four reduced template cells. Textile cell 825 replaces the four reduced template cells with four interlocking textile cells similar to textile cell 815, shown previously in FIG. 8A.

Referring now to FIG. 8C, replication of the template cell 810 and the textile cell 815, both shown previously in FIG. 8A, of a quadrilateral base shape is shown for both template cell 830 and textile cell 835 in accordance with one embodiment. During replication, the original template cell 810 of the quadrilateral base shape is replaced by a copy at each vertex, creating the replicated template cell 830 with four copies of template cell 810. In other embodiments, different replication strategies may be employed, including surrounding an original center template cell with eight copies of the template cell.

Referring now to FIG. 8D, replication and subdivision of the template cell 810 and the textile cell 815, both shown previously in FIG. 8A, of a quadrilateral base shape is shown for both the template cell 840 and the textile cell 845 in accordance with one embodiment. During replication the original template cell of the quadrilateral base shape is replaced by a copy at each vertex, as shown previously in FIG. 8C, and then each template cell is subdivided, as shown previously in FIG. 8B, creating the replicated and subdivided template cell 840. In other embodiments, different subdivision and/or replication strategies may be employed, including surrounding and/or subdividing an original center template cell with eight copies of the template cell.

Referring now to FIG. 9A, a template cell 910 and a textile cell 915 of a pentagon base shape is shown in accordance with one embodiment. The illustrated textile cell 915 combines five different 3D interlocking loops, each loop associated with a different vertex and midpoint of an edge of the underlying template cell 910. Each loop extends from the vertex around a centroid and past the midpoint of the opposite edge of the underlying the template cell 910.

Referring now to FIG. 9B, subdivision of a pentagon base shape, shown previously in FIG. 9A, is shown for both the template cell 920 and the textile cell 925 in accordance with one embodiment. During subdivision, the original template cell 910 of the pentagon base shape is replaced by copies of the original template cell at each vertex. The copies are scaled down from their respective vertex. Unlike previous examples, the subdivided template cell 920 includes five overlapping scaled copies of the original template cell. In one embodiment, the subdivided template cell 920 includes overlapping portions shared by two or more scaled copies of the original template cell. The illustrated textile cell 925 combines 3D interlocking loops from each of the five overlapping scaled copies of the original textile cell, such as the textile cell 915 shown in FIG. 9A.

Referring now to FIG. 9C, replication of the template cell 910 and the textile cell 915, both shown previously in FIG. 9A, of a pentagon base shape is shown for both template cell 930 and textile cell 935 in accordance with one embodiment. During replication, a copy of the original template cell 910 is placed on each edge, creating the replicated template cell 930 having five copies surrounding the original template cell 910. In other embodiments, different replication strategies may be employed, including the use of overlapping cells, as previously described in FIG. 9B in conjunction with subdivision. In one embodiment, replication may merely be subdivision without scaling. The illustrated textile cell 935 combines 3D interlocking loops from each of the five overlapping scaled copies of the original textile cell, such as textile cell 915 shown in FIG. 9A.

Referring now to FIG. 9D, subdivision and replication of the template cell 910 and the textile cell 915, both shown previously in FIG. 9A, of a pentagon base shape is shown for both the template cell 940 and the textile cell 945 in accordance with one embodiment. In one embodiment, replication of the pentagon base shape places a copy of the original template cell on each edge, creating the replicated template cell (see e.g., replicated template cell 930 in FIG. 9C). Each template cell within the new replicated template cell is then subdivided, as shown previously in FIG. 9B, creating the replicated and subdivided template cell 940. In other embodiments, different subdivision and/or replication strategies may be employed, including the use of overlapping cells during replication and/or subdivision. The illustrated textile cell 945 combines 3D interlocking loops from each of the interlocking textile cells, such as textile cell 925 shown in FIG. 9B.

Referring now to FIG. 10A, a template cell 1010 and a textile cell 1015 of a hexagon base shape is shown in accordance with one embodiment. The illustrated textile cell 1015 combines 3D interlocking loops, each loop associated with a different midpoint of an edge of the underlying template cell 1010. Each loop extends around the associated midpoint and around a centroid of the underlying template cell 1010. In another embodiment, each loop may be associated with a different vertex of the underlying template cell 1010. Each loop extends around the associated vertex and around a centroid of the underlying template cell 1010.

Referring now to FIG. 10B, subdivision of a hexagon base shape, shown previously in FIG. 10A, is shown for both the template cell 1020 and the textile cell 1025 in accordance with one embodiment. During subdivision, the original template cell 1010 of the pentagon base shape is replaced by copies of the original template cell at each vertex. The copied template cells are scaled down at their respective vertex. The subdivided template cell 1020 includes six overlapping scaled copies of the original template cell. In one embodiment, the subdivided template cell 1020 includes overlapping portions shared by two or more scaled copies of the original template cell. The illustrated textile cell 1025 combines 3D interlocking loops from each of the overlapping scaled copies of the original textile cell, such as textile cell 1015 shown in FIG. 10A.

Referring now to FIG. 10C, replication of the template cell 1010 and the textile cell 1015, both shown previously in FIG. 10A, of a hexagon base shape is shown for both template cell 1030 and textile cell 1035 in accordance with one embodiment. During replication, a copy of the original template cell 1010 is placed on each edge, creating the replicated template cell 1030 having six copies surrounding the original template cell 1010. In other embodiments, different replication strategies may be employed, including the use of overlapping cells, as previously described in FIG. 10B in conjunction with subdivision. As previously mentioned, in one embodiment, replication may merely be subdivision without scaling.

Referring now to FIG. 10D, subdivision and replication of a hexagon base shape is shown for both the template cell 1040 and the textile cell 1045 in accordance with one embodiment. More specifically, the template cell and the textile cell of the hexagon base shape (e.g., the template cell 1010 and the textile cell 1015 both shown previously in FIG. 10A) are replicated, as shown previously in FIG. 10C, and each replicated cell is subdivided as shown previously in FIG. 10B. In one embodiment, replication of the hexagon base shape causes growth to be mirrored about each edge of the original base shape. More specifically, the illustrated growth places a copy of the original template cell on each edge, creating the replicated template cell (see e.g., replicated template cell 1030 in FIG. 10C). Each template cell within the new replicated template cell is then subdivided, as shown previously in FIG. 10B, creating the replicated and subdivided template cell 1040. In other embodiments, different subdivision and/or replication strategies may be employed, including the use of overlapping cells during replication and/or subdivision. In one embodiment, the illustrated textile cell 1045 combines 3D interlocking loops from each of the individual interlocking textile cells, such as textile cell 1025 shown in FIG. 10B, with neighboring textile cells.

Figure 11D:
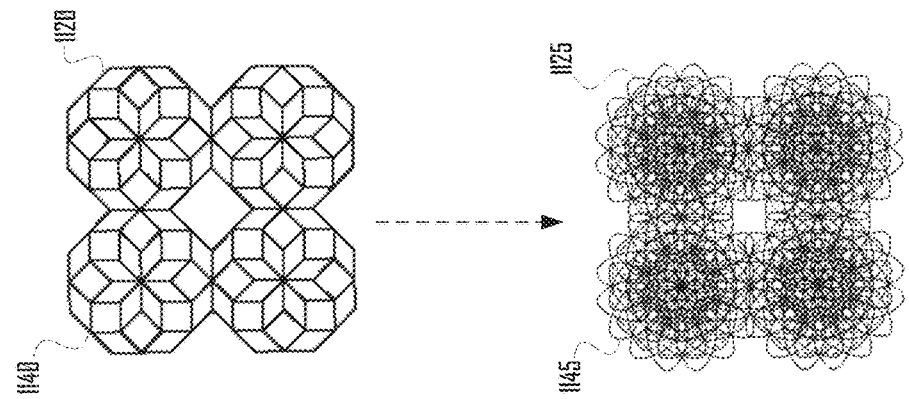
FIG. 11D illustrates subdivision and replication of the template cell and the textile cell shown in FIG. 11A in accordance with one embodiment.
Figure 11C:
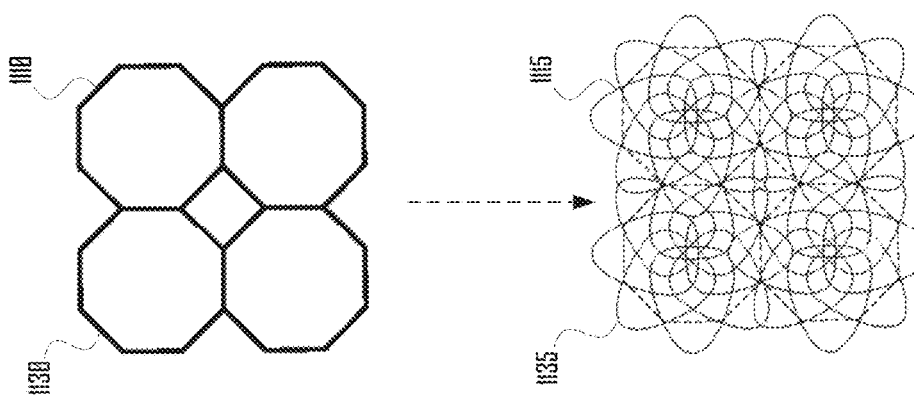
FIG. 11C illustrates replication of the template cell and the textile cell shown in FIG. 11A in accordance with one embodiment.
Figures 11A, 11B:
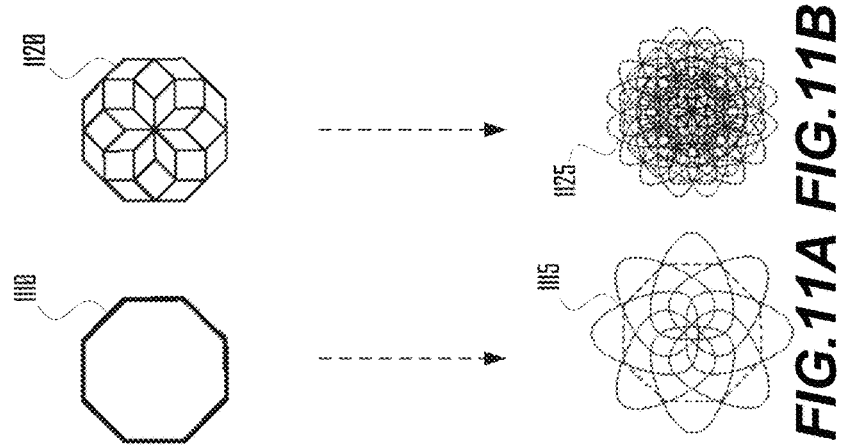
FIG. 11A illustrates a template cell and a textile cell of an octagon base shape in accordance with one embodiment.
FIG. 11B illustrates subdivision of the template cell and the textile cell shown in FIG. 11A in accordance with one embodiment.

Referring now to FIG. 11A, a template cell 1110 and a textile cell 1115 of an octagon base shape are shown in accordance with one embodiment. The illustrated textile cell 1115 combines 3D interlocking loops, each loop associated with a different midpoint of an edge of the underlying template cell 1110. Each loop extends around the associated midpoint and around a centroid of the underlying template cell 1110.

Referring now to FIG. 11B, subdivision of the template cell 1110, shown previously in FIG. 11A, is shown for a template cell 1120 and a textile cell 1125 in accordance with one embodiment. During subdivision, the original template cell 1110 of the octagon base shape is copied at each vertex. The copies are scaled down from their respective vertex. The scaled copied template cells create the subdivided template cell 1120 with eight reduced overlapping template cells. Textile cell 1125 replaces the eight reduced overlapping template cells with eight interlocking textile cells similar to textile cell 1115, shown previously in FIG. 11A.

Referring now to FIG. 11C, replication of the template cell 1110 and the textile cell 1115, both shown previously in FIG. 11A, of an octagon base shape is shown for both template cell 1130 and textile cell 1135 in accordance with one embodiment. During replication, the original template cell 1110 of the octagon base shape is repeatedly copied and rotated 90 degrees until the replicated template cell 1130 is created. The replicated template cell 1130 includes four primary template cells and a secondary template cell, each primary template cell resembling the original octagon template cell 1110 and the secondary template cell being a quadrilateral. In contrast to earlier replication examples, replication of the octagon base shape in the above described manner creates a secondary base shape in the replicated template cell 1130. In other embodiments, different replication strategies may be employed. For example, as previously mentioned, in one embodiment, replication may merely be subdivision without scaling. Accordingly, the overlapping subdivision of the octagon base shape previously demonstrated in FIG. 11B might also be employed in a replicating stage.

Referring now to FIG. 11D, subdivision and replication of a octagon base shape is shown for both the template cell 1140 and the textile cell 1145 in accordance with one embodiment. More specifically, the template cell and the textile cell of the octagon base shape (e.g., the template cell 1110 and the textile cell 1115 both shown previously in FIG. 11A) are replicated, as shown previously in FIG. 11C, and each replicated cell is subdivided as shown previously in FIG. 11B. In the illustrated embodiment, each primary template cell and textile cell resembles the original subdivided octagon template cell 1120 and textile cell 1125, but the illustrated secondary textile cell does not include additional interlocking or intersecting materials. Other embodiments could include a different design for the secondary textile cell, such as the 3D interlocking loop configuration shown previously in FIG. 8A.

Although specific embodiments have been illustrated and described in FIGS. 7-11, a variety of alternate tessellations and/or aggregations may be substituted for the specific embodiments shown and described without departing from the scope of the present disclosure. In particular, as shown in some of the illustrated base shape subdivisons, any number of different base shapes may be combined into an aggregation. This application is intended to cover any adaptations or variations of the embodiments discussed herein.

Referring now to FIG. 12, a template cell 1210 and textile cell 1215 of a triangular base shape 1205 is shown as part of an aggregation 1200A in accordance with one embodiment. In the illustrated embodiment, the textile cell 1215 exhibits an interconnection pattern that matches with neighboring triangular base shapes to interlock with each other. In one embodiment, the triangular base shape 1205 may also be replicated as an inverted triangular base shape 1220. In one embodiment, the interconnection pattern of the textile cell 1215 in both the base shape 1205 and the inverted base shape 1220 match to allow interlocking. The aggregation 1200B represents a 3D seamless mesh where all the interconnected base shapes are interlocked.

Figure 13:
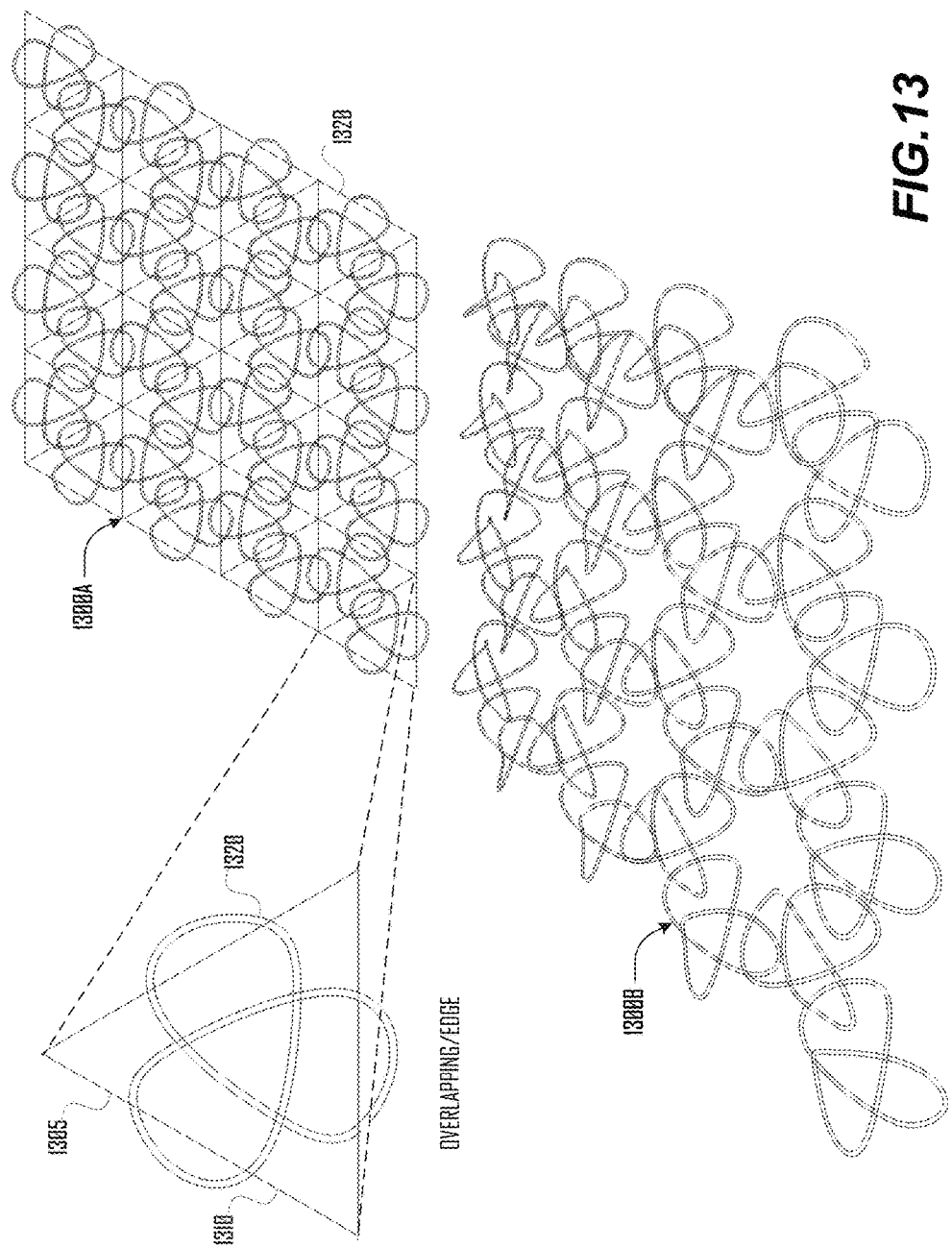
FIG. 13 illustrates an aggregation of textile cells with an overlapping edge interlocking neighboring textile cells in accordance with one embodiment.

Referring now to FIG. 13, base cell aggregation in accordance with one embodiment. a template cell 1310 and textile cell 1315 of a triangular base shape 1305 is shown as part of an aggregation 1300A in accordance with one embodiment. In the illustrated embodiment, the textile cell 1315 exhibits an overlapping pattern in which loops extend into neighboring triangular base shapes and interlock with each other. In one embodiment, the triangular base shape 1305 may also be replicated as an inverted triangular base shape 1320. In one embodiment, the overlapping pattern of the textile cell 1315 in both the base shape 1305 and the inverted base shape 1320 interlock. The aggregation 1300B represents a 3D seamless mesh in which all the overlapping base shapes are interlocked.

Although specific embodiments have been illustrated and described in FIGS. 12 and 13, a variety of alternate interconnections and/or overlapping patterns may be substituted for the specific embodiments shown and described without departing from the scope of the present disclosure. In particular, base shapes within a seamless mesh may exhibit both interconnection and overlap to interlock with neighboring base shapes. Moreover, any number of different base shapes may be combined and interlocked into an aggregation. This application is intended to cover any adaptations or variations of the embodiments shown and/or discussed herein.

Figure 14:
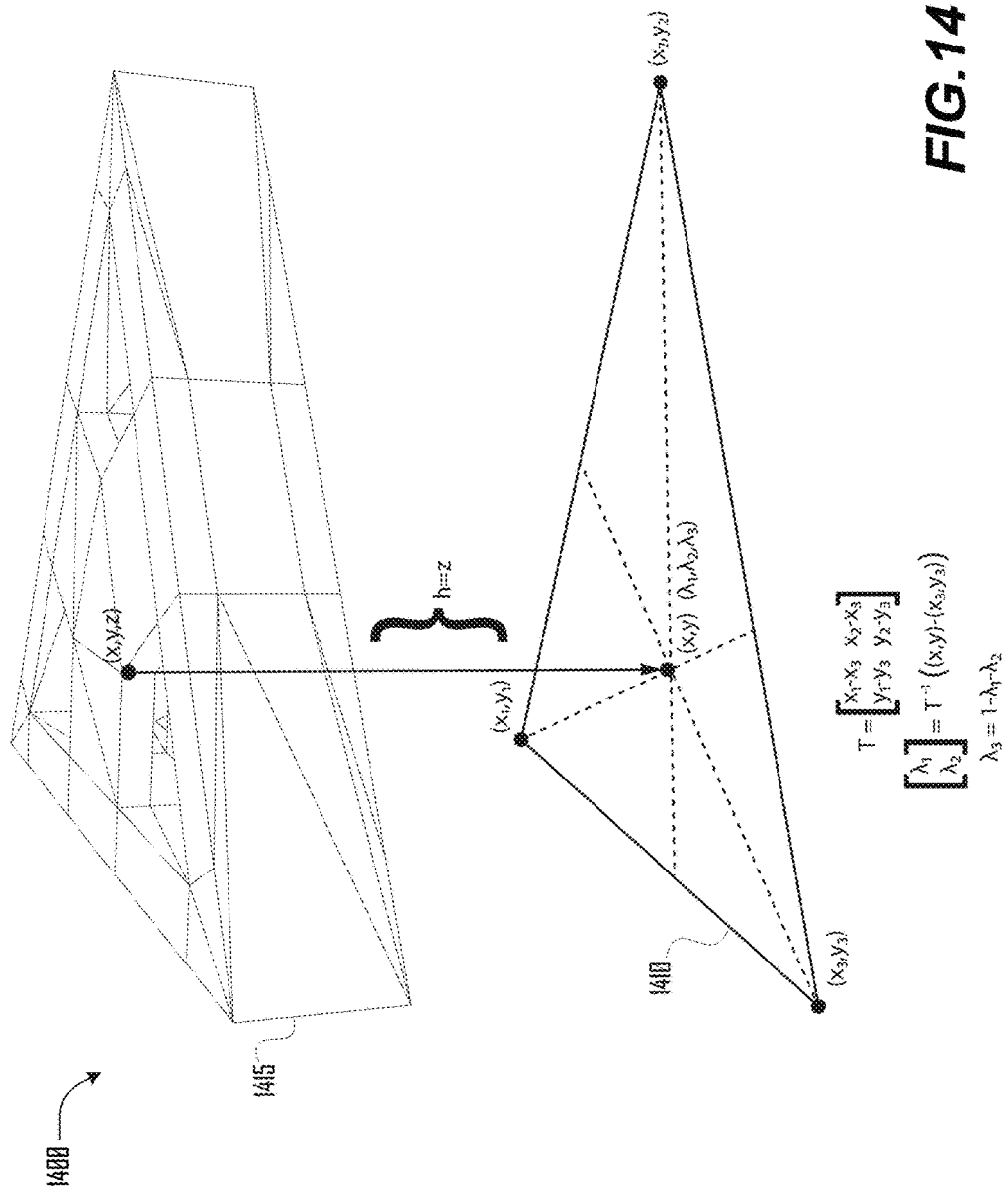
FIG. 14 illustrates mapping a textile cell onto a template cell of a triangular base shape in accordance with one embodiment.

Referring now to FIG. 14, the mapping of a textile cell 1415 onto a template cell 1410 of a triangular base shape 1400 is shown in accordance with one embodiment. A triangular base shape 1400 includes a template cell 1410 and a textile cell 1415. In one embodiment, the textile cell 1415 may be directly mapped onto the template cell 1410. In one embodiment, each vertex of the textile cell 1415 is projected to the template cell 1410. (See e.g., $(x_1, y_1)$, $(x_2, y_2)$, and $(x_3,$ $y_3$) in FIG. 14). Accordingly, in an embodiment, coordinates of the textile cell may be stored based on the relative vertices of the template cell. More specifically, in one embodiment, Cartesian coordinates within the base shape may be transformed into barycentric coordinates. Using this system each point will normally include an array of N number of vertices, so each point within a triangular template cell 1410 will have three numbers in a corresponding barycentric coordinate (11,12,13), and a 4 sided template cell will have four numbers in a barycentric coordinate (11,12,13,14). In one embodiment, the z value of each vertex coordinate is also stored. For example, in a 2D mapping of a 3D base shape, the z value may be equivalent to h at any given coordinate (x,y) of the base shape.

Figure 36:
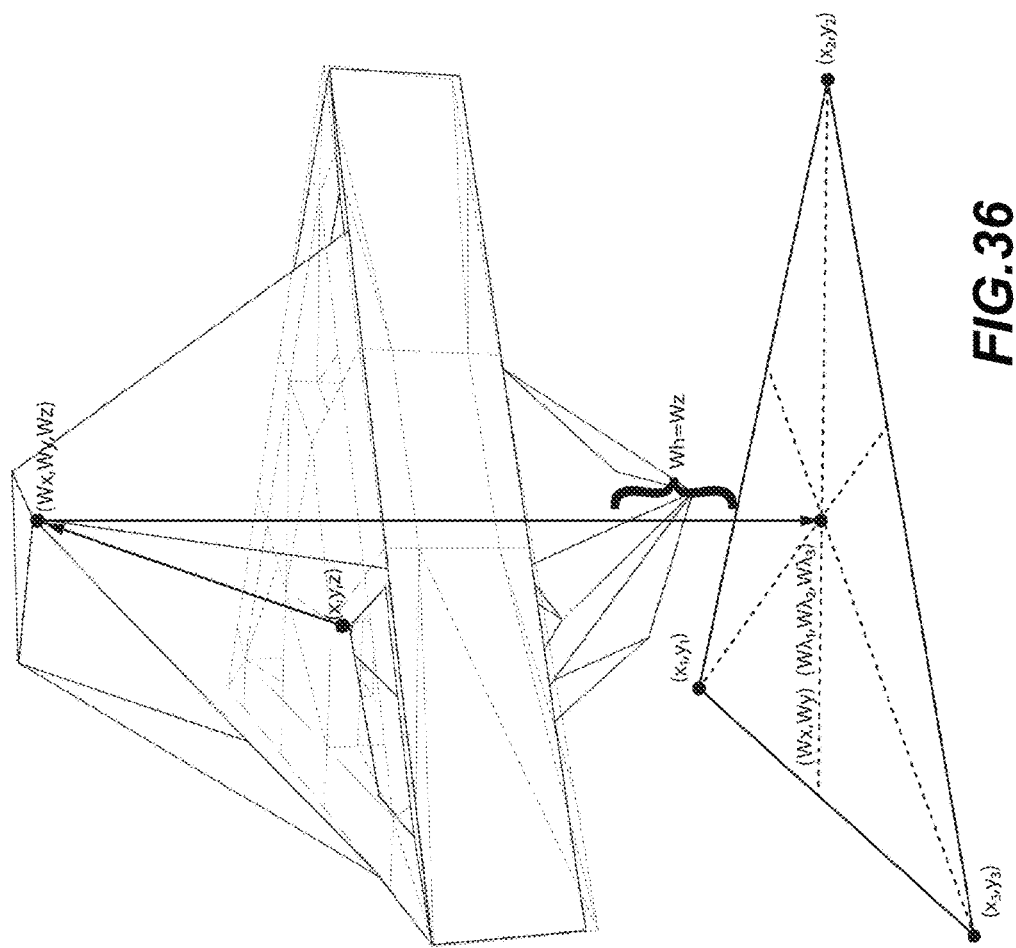
FIG. 36 illustrates mapping a warped textile cell onto a template cell of a triangular base shape from FIG. 14 in accordance with one embodiment.

Referring now to FIG. 36, in order to make a textile cell parametric, the parts can change based on curvature or attractors. In one embodiment, only two states of the textile need to be stored in order to generate a range of warped textiles, a base state see e.g., FIG. 14 and a warped state, see e.g., FIG. 36. Each vertex of the base state and warped state are stored with a barycentric coordinate and offset, h. In one embodiment, it is possible to interpolate between these two points, either linearly, or quadratically in order to find the correct locations of the textile vertices in a corresponding state. The textile can exist in any state between the base state and warped state. These set the two extreme states for the shape.

In this manner, on any manifold surface, any point on the surface can be defined by a x,y coordinate. Once coordinates are selected, the distance to the original point can be queried from any other coordinate point (x,y). Based on this distance, textile properties can be changed. Secondly, multiple x,y points can be connected by lines, or curves, which can be closed. If a template cell's x,y coordinate is inside of this line/curve made up of multiple x,y coordinates, the template cell may be included in a first textile cell, see e.g., FIG. 15A, while template cells outside of this demarcated line may be part of another neighboring textile cell see e.g., FIG. 15B.

Figure 15A:
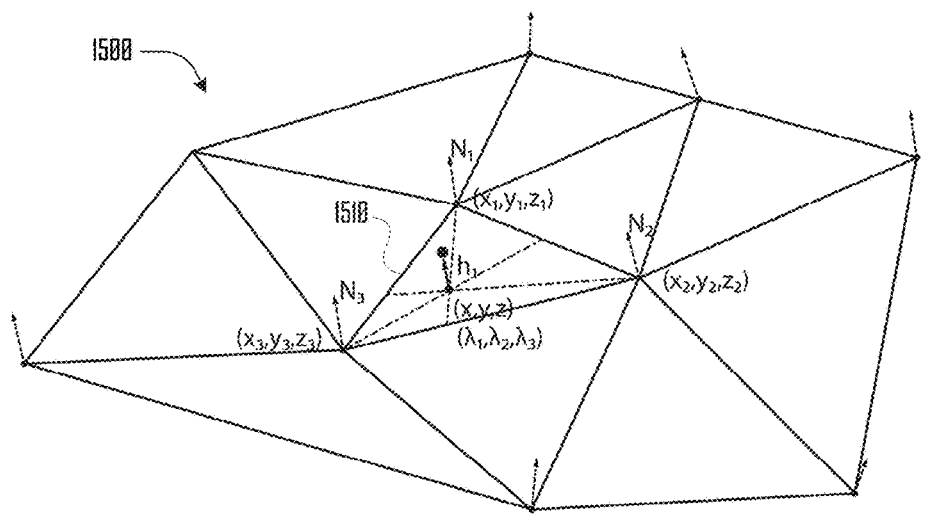
FIG. 15A illustrates an aggregate surface with several triangular template cells in accordance with one embodiment.

More specifically, referring now to FIG. 15A, a surface 1500 with several triangular template cells 1510 are shown in accordance with one embodiment. In the illustrated embodiment, several triangular template cells (mapped and/or unmapped) surround a template cell to be mapped. In order to get a textile cell to map to the desired mapped template cell, a barycentric coordinate for each vertex that was stored is converted to an actual (x,y,z) coordinate based on the different vertices of the triangular template cell. This newly mapped point, which is positioned with respect to the triangular template cell being mapped, must be offset based on a weighted normal direction. The barycentric coordinates provide weighted values to apply to each respective vertex normal.

Figure 15B:
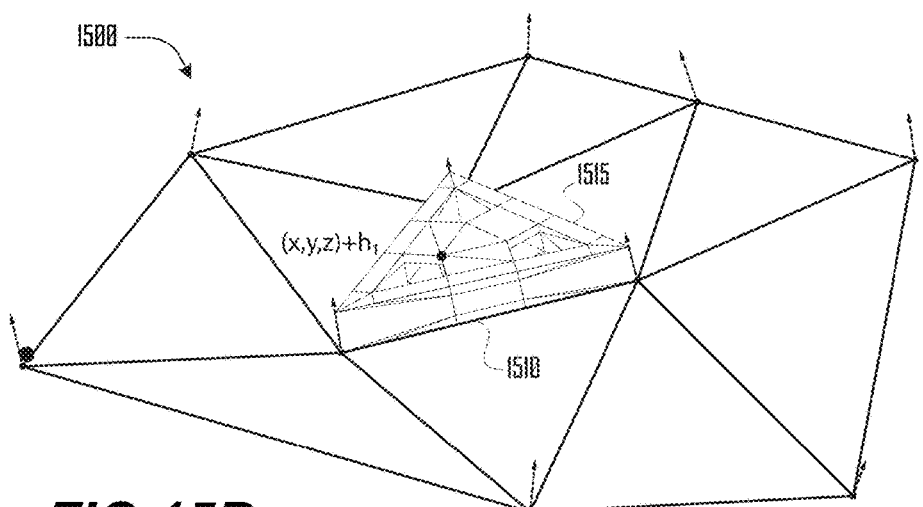
FIG. 15B illustrates a textile cell mapped to a template cell of a triangular base shape within an aggregate surface in accordance with one embodiment.

Referring now to FIG. 15B, a textile cell is mapped to a template cell of a triangular base shape on an aggregate mesh in accordance with one embodiment. The mapped point that is offset by the weighted normal identifies the vertex of the mapped triangular textile cell. The mesh topology of the textile cell does not change, only the locations of the vertices, so the face indices of the mesh do not change. A new mapped triangular textile cell is created from the new vertex locations, and the same mesh face indices of the original triangular textile cell can be replicated onto the mesh.

Figure 35:
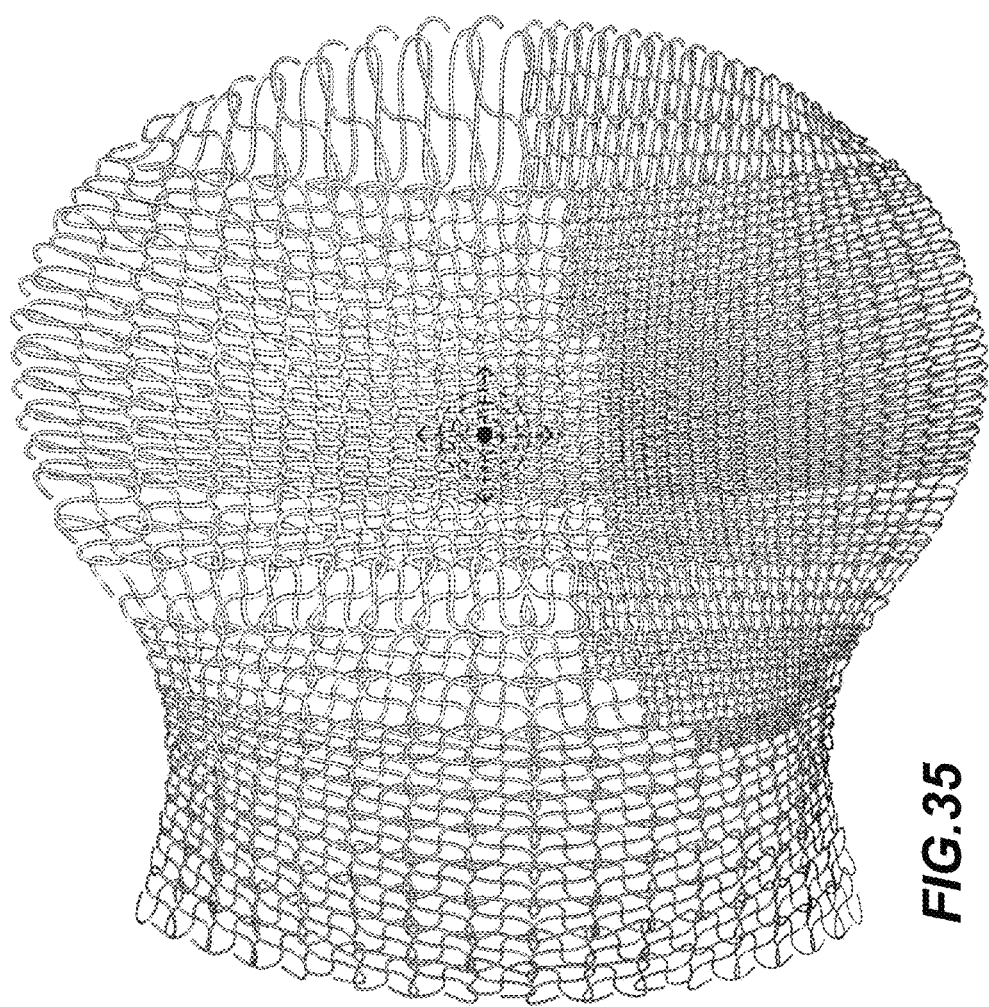
FIG. 35 illustrates a top view the seamless mesh with attractor point and curvature variation in accordance with one embodiment.

Although specific embodiments of mapping have been illustrated and described in FIGS. 14 and 15, a variety of alternate mapping and/or textile projection may be substituted for the specific embodiments shown and described without departing from the scope of the present disclosure. In particular, these help illustrate how to map points from a template to a mapped template. While the illustrated textile embodiment is a mesh, in other embodiments the textile can also be made of curves, which can be modified. (See e.g., FIG. 35 where the curves are thickened) The curves control points can also be projected and stored as a barycentric coordinate of a template to be mapped using the conversion to Cartesian coordinates. The offset being based on the weighted normal of the mapped vertices of the template. This application is intended to cover any adaptations or variations of the embodiments shown and/or discussed herein.

Referring now to FIG. 16A, variations of a triangular base shape are shown including a textile cell 1610 and an inverted textile cell 1620 in accordance with one embodiment. Referring now to FIG. 16B, the textile cell 1610 is joined to the inverted textile cell 1620 along a shared edge. In one embodiment, the joined textile cell 1610 and inverted textile cell 1620 both overlap and are designed to interlock inside of each cell.

In one embodiment, base shapes are combined to form new composite base shapes. Referring now to FIG. 16C, a plan view shows an example of a composite hexagon base shape formed from an aggregation of triangular base shapes in accordance with one embodiment. More specifically, six triangular textile cells are positioned about a center vertex to form the hexagon base shape. The component textile cells of the hexagon base shape alternate between textile cell 1610 and inverted textile cell 1620. FIG. 16D illustrates a perspective view of the hexagon base shape shown in FIG. 16C in accordance with one embodiment.

Referring now to FIG. 16E, a triangular composite mesh using triangle base shapes and inverted triangle base shapes is shown in accordance with one embodiment.

FIG. 16F illustrates a plan view of a hexagon composite mesh formed from the hexagon base shape shown in FIG. 16C in accordance with one embodiment. More specifically, each hexagon textile cell is formed from three textile cells 1610 and three inverted textile cells 1620. FIG. 16G illustrates a perspective view of the hexagon composite mesh shown in FIG. 16F in accordance with one embodiment.

In one embodiment, the hexagon composite mesh only includes complete hexagon shapes. Accordingly, in one embodiment, when compared with the triangular composite mesh shown in FIG. 16E, the hexagon composite mesh of FIG. 16F might drop triangle textile cells and inverted triangle textile cells along the edges of the mesh. This can facilitate joining one hexagon composite mesh with another similar hexagon composite mesh after the edges are aligned. Alternatively, in another embodiment, the composite mesh might use both hexagon base shapes and triangle base shapes along the edges to keep the edge straight. Use of straight edges can facilitate joining one composite mesh with a different composite mesh since alignment is considered easier.

Figure 17A:
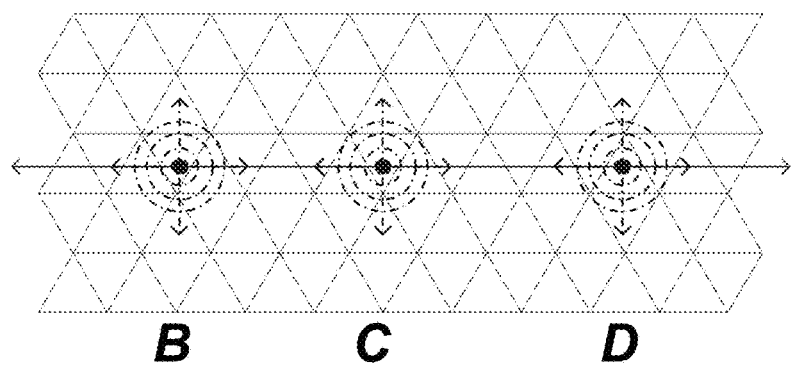
FIG. 17A illustrates a plan view of a triangular input shape including multiple attractor points in accordance with one embodiment.
Figure 17B:
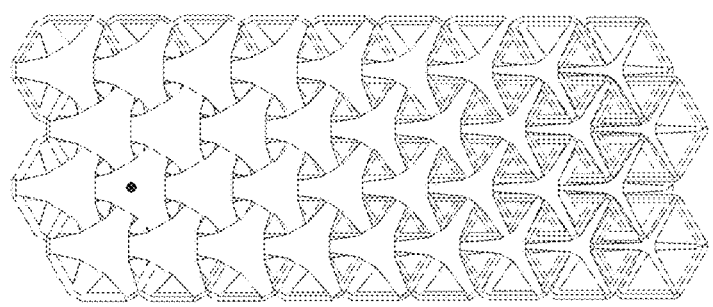
FIGS. 17B-FIG. 17D illustrate different top views of a seamless mesh thickening different textile cells near each attractor points in accordance with one embodiment.
Figure 17C:
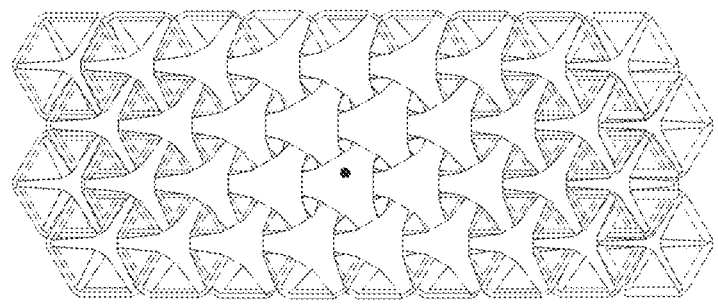
Figure 17D:
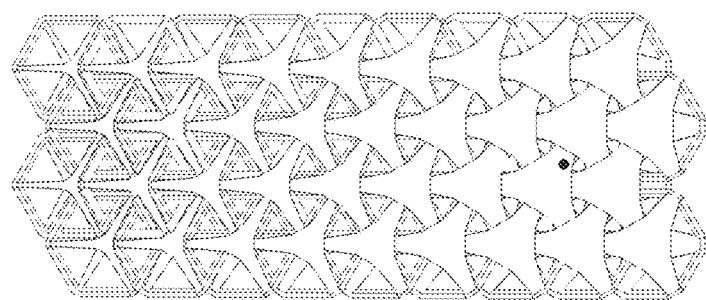

Referring now to FIG. 17A, a plan view of a triangular input shape shows multiple attractor points in accordance with one embodiment. FIGS. 17B-FIG. 17D each illustrate a different top view of the same seamless mesh, but thickening textile cells in proximity to the respective attractor point shown in FIG. 17A. FIG. 18A illustrates a perspective view of the seamless mesh shown in FIG. 17C in accordance with one embodiment. FIG. 18B illustrates a side view of the seamless mesh shown in FIG. 18A in accordance with one embodiment.

Referring now to FIG. 19A, a plan view of an octahedral base shape with a template cell 1910 and a textile cell 1915 is shown in accordance with one embodiment. In one embodiment, the base shape includes an octahedral template cell 1910 with an octahedral textile cell 1915, which connects each vertex to the centroid of the template cell 1910 with a tube/bar. In one embodiment, properties, such as thickness, of each tube/bar is variable depending in part on data from an input shape and/or rules associated with a particular base shape. For example, relative thickness of the base shape may change depending in part on where a particular base shape is positioned on the input shape. Alternatively, relative curvature of the input shape or relative positioning of the base shape with respect to an attractor point may also influence properties of the bar/tube within the base shape. In one embodiment, the bar/tube thickness should be at least 0.7 mm for available additive manufacturing techniques. With development of higher resolution printing, it is anticipated that this size can get smaller.

Referring now to FIG. 19B, a perspective view of the octahedral base shape with the template cell 1910 and the textile cell 1915 is shown in accordance with one embodiment. The octahedral template cell 1910 is shown in phantom line surrounding the octahedral textile cell 1915 that connects each vertex of the octahedral template to the centroid of the octahedral template with a bar/tube.

Referring to FIG. 19C, in accordance with one embodiment, a plan view of a volumetric replication is shown of the octahedral base shape previously shown in and described in FIG. 19A and eight tetrahedral base shapes 1920 shown and described in FIG. 19E. Correspondingly, FIG. 19D shows a perspective view of the volumetric replication shown previously in FIG. 19C of the octahedral base shape 1940 shown and described previously in FIG. 19A and eight tetrahedral base shapes 1920 shown and described in FIG. 19E in accordance with one embodiment. In one embodiment, the volumetric replication each of the eight faces of the octahedral base shape align with a face of a different tetrahedral base shape, where the opposite vertex of the tetrahedral base shape 1920 points outwards away from the internal octahedral base shape 1940.

Referring now to FIG. 19E, a plan view of a tetrahedral base shape with a template cell 1930 and a textile cell 1935 is shown in accordance with one embodiment. In one embodiment, the base shape includes an tetrahedral template cell 1930 with an octahedral textile cell 1935, which connects each vertex to the centroid of the template cell 1930 with a tube/bar.

Referring now to FIG. 19F, a perspective view of the tetrahedral base shape with the template cell 1930 and the textile cell 1935 is shown in accordance with one embodiment. The tetrahedral template cell 1930 is shown in phantom line surrounding the tetrahedral textile cell 1935 that connects each vertex of the tetrahedral template cell 1930 to the centroid of the tetrahedral template cell 1930 with a bar/tube.

Referring now to FIG. 19G, a plan view of a volumetric replication of the tetrahedral base shape and four octahedral base shapes 1940 is shown in accordance with one embodiment. Correspondingly, FIG. 19H shows a perspective view of a volumetric replication of the tetrahedral base shape 1920 and four octahedral base shapes 1940 in accordance with one embodiment. In one embodiment, each octahedral base shape 1940 is aligned with a different face of the internal tetrahedral base shape 1920, such that at least one face of each octahedral base shape 1940 abuts a different face of the tetrahedral base shape 1920, but each of the octahedral base shapes 1940 do not overlap the internal tetrahedral base shape 1920.

Referring now to FIG. 19I, a perspective view of a volumetric space of an input shape 1950 is shown that includes three overlapping spheres in accordance with one embodiment. In one embodiment, the input shape 1950 may be modeled in a standard 3D modeling program, and consists of three overlapping spheres united together. This particular input shape is a single closed mesh cell. In addition to the 3D surface, a closed mesh cell may in some embodiments also represent a volumetric space that may be filled using space filling polyhedral base cells, such as those shown in FIGS. 19A-19G. In FIG. 19I, the surface of this mesh cell may include at least one base shape, each base shape including a polygon template cell and textile cell to cover the surface of the mesh cell. In this way the cells cover both volume and surface. For example, FIG. 19J illustrates a perspective view of a seamless mesh 1960 of replicated volumetric base shapes for the input shape 1950 shown previously in FIG. 19I.

Figure 20:
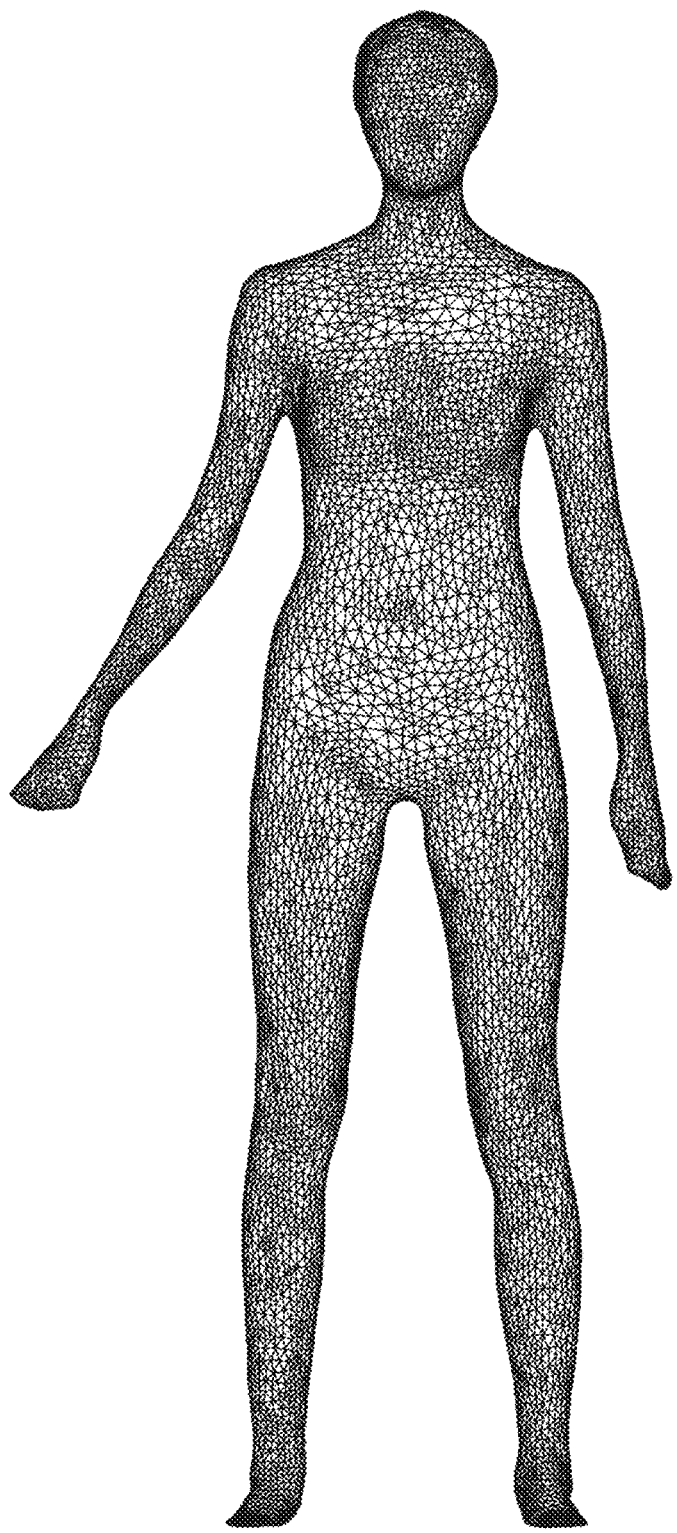
FIG. 20 illustrates a perspective view of a mesh generated from a 3D scan input in accordance with one embodiment.

FIG. 20 illustrates a perspective view of a mesh generated from a 3D scan input in accordance with one embodiment.

Figure 21:
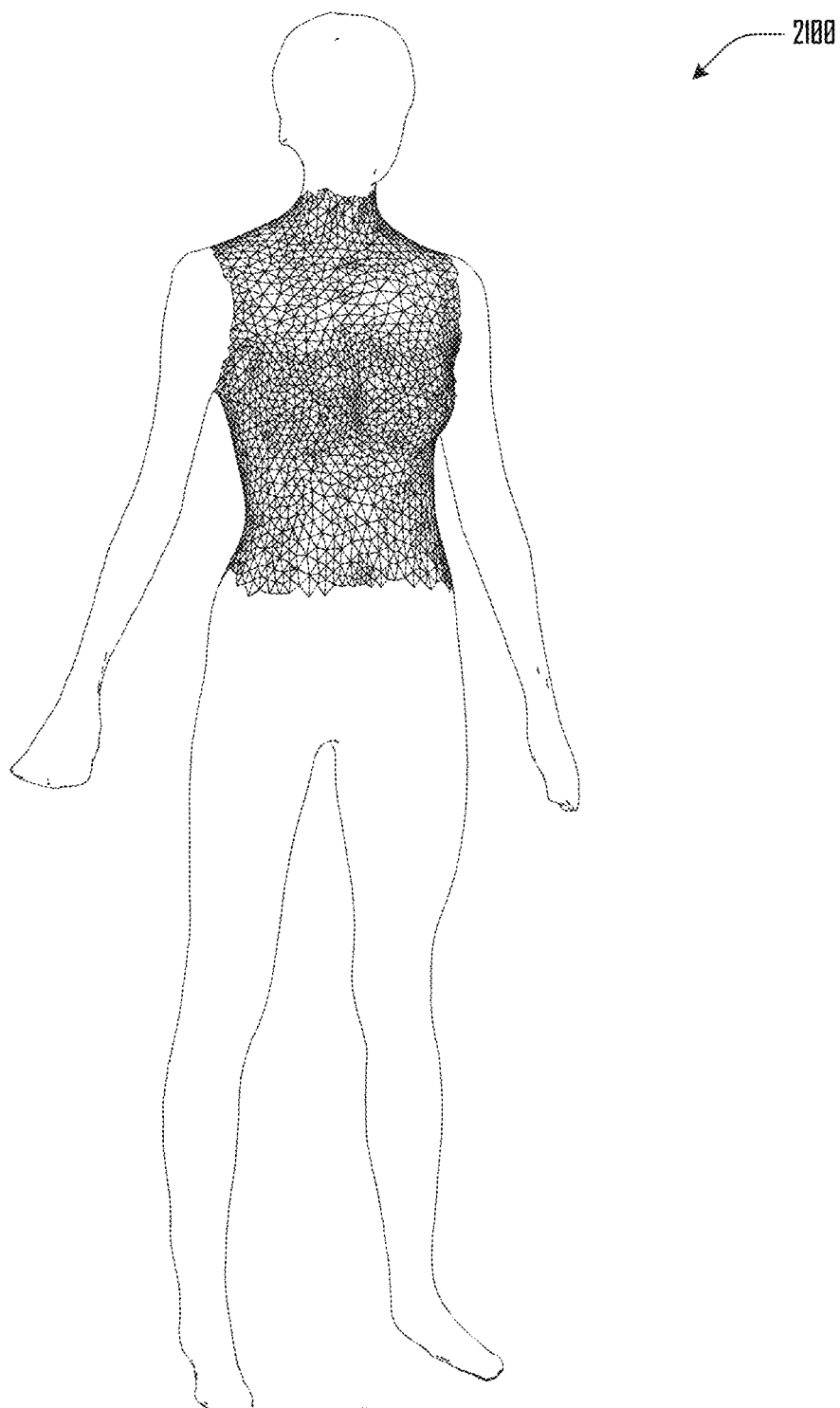
FIG. 21 illustrates a perspective view of an input shape selected from a portion of the 3D scan in FIG. 20 in accordance with one embodiment.

FIG. 21 illustrates a perspective view of an input shape selected from a portion of the 3D scan in FIG. 20 in accordance with one embodiment.

Figure 22:
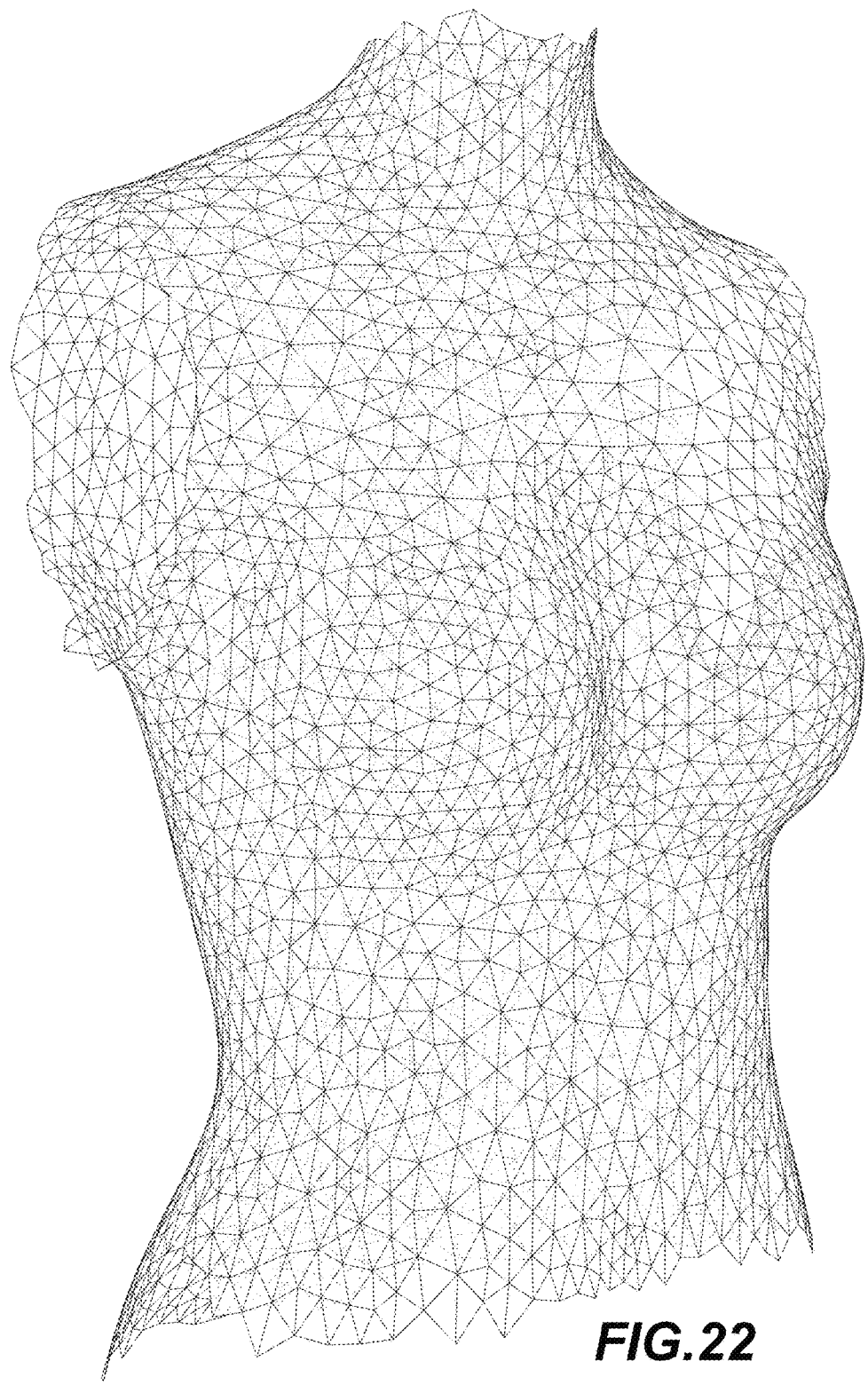
FIG. 22 illustrates a perspective view of an irregular mesh of the input shape in accordance with one embodiment.

FIG. 22 illustrates a perspective view of an irregular mesh of the input shape in accordance with one embodiment. The irregular mesh is generated from the input shape from FIG. 21 tessellated with the original mesh tessellation from a portion of the 3D scan in FIG. 20??

Figure 23:
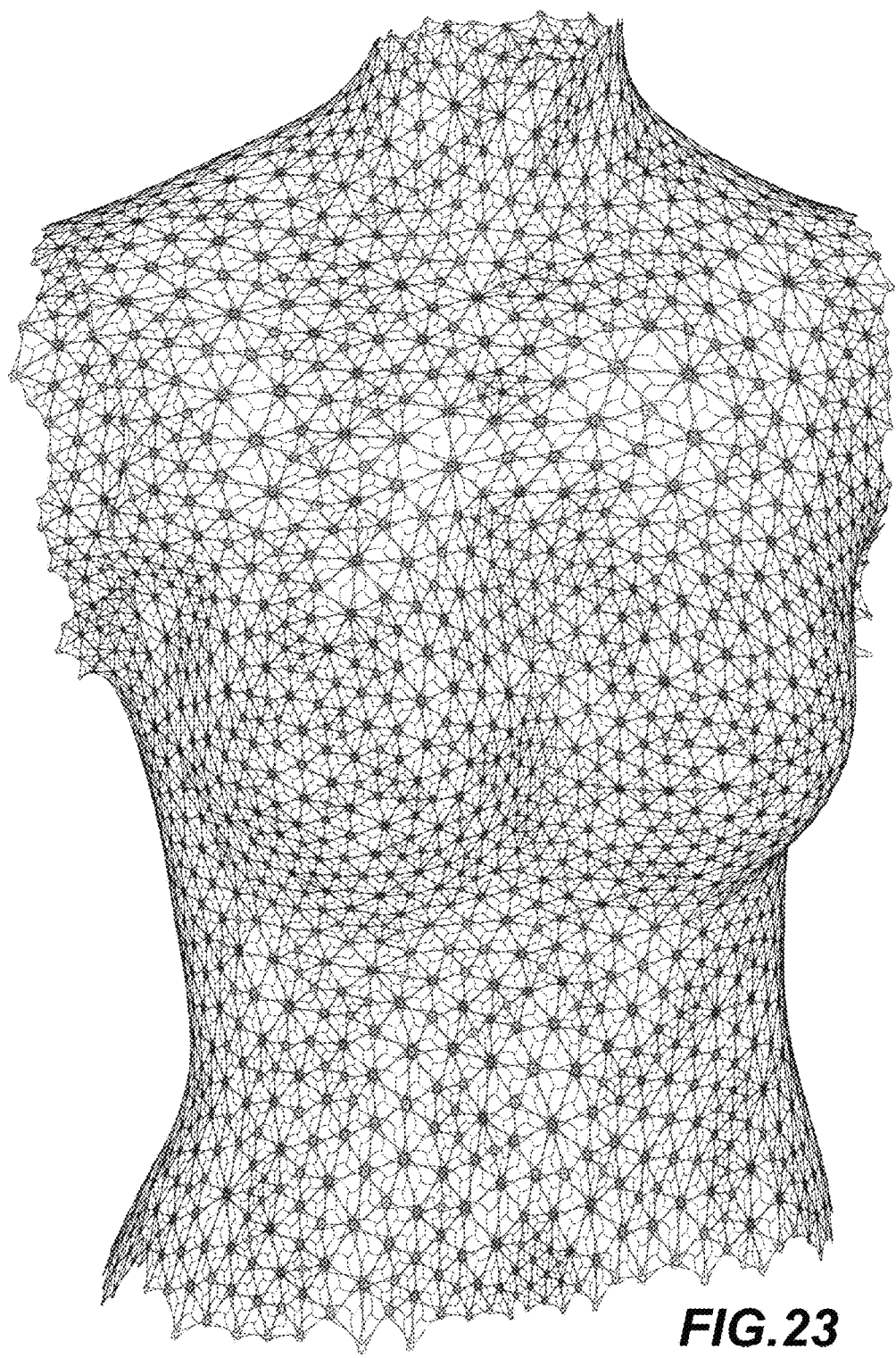
FIG. 23 illustrates a perspective view of the original mesh tessellation replaced with a triangular base shape in accordance with one embodiment.
Figure 24:
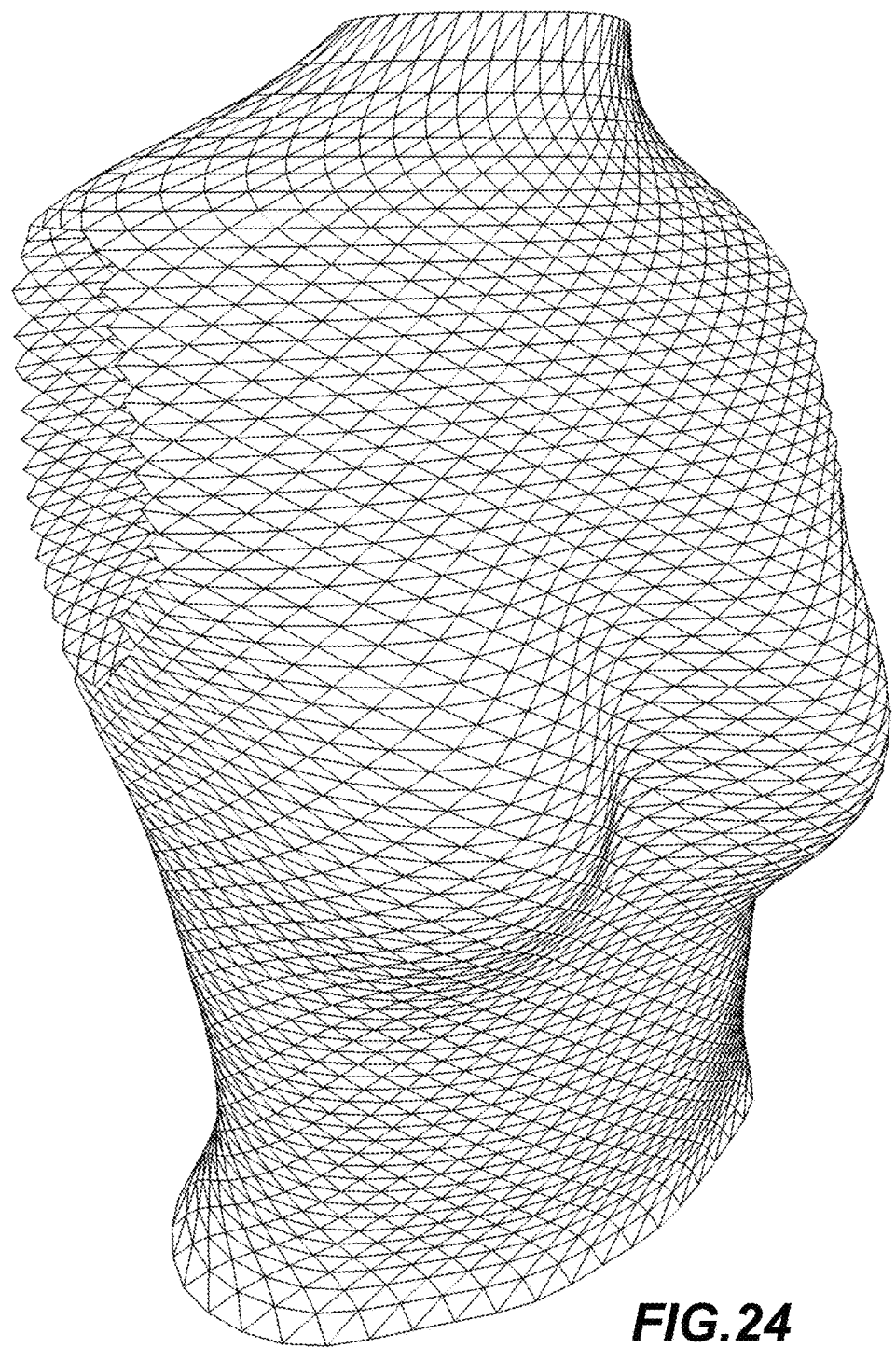
FIG. 24 illustrates a perspective view of a regular mesh of the input shape in accordance with one embodiment.
Figure 25:
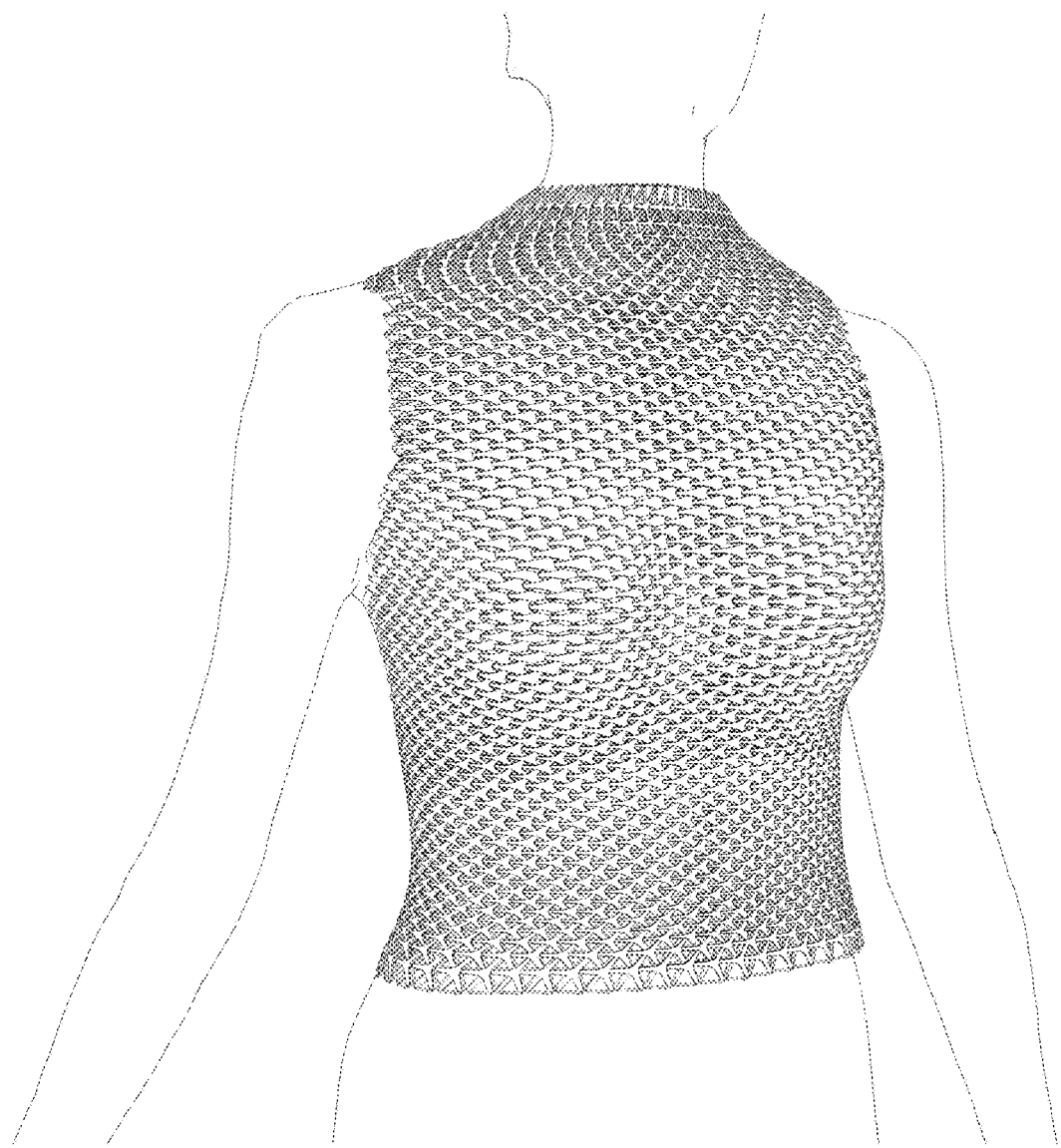
FIG. 25 illustrates a perspective view of the regular mesh with a triangular textile-cell in accordance with one embodiment.

FIG. 23 illustrates a perspective view of the original mesh tessellation replaced with a triangular base shape in accordance with one embodiment. The illustrated mesh includes both the template cell and textile cells for the triangular base shape. Referring now to FIG. 24, the input shape is shown after being retopologized with a regular mesh. FIG. 25 illustrates a perspective view of the regular mesh with a triangular textile-cell replacing the template cell shown previously in FIG. 24.

Figure 26:
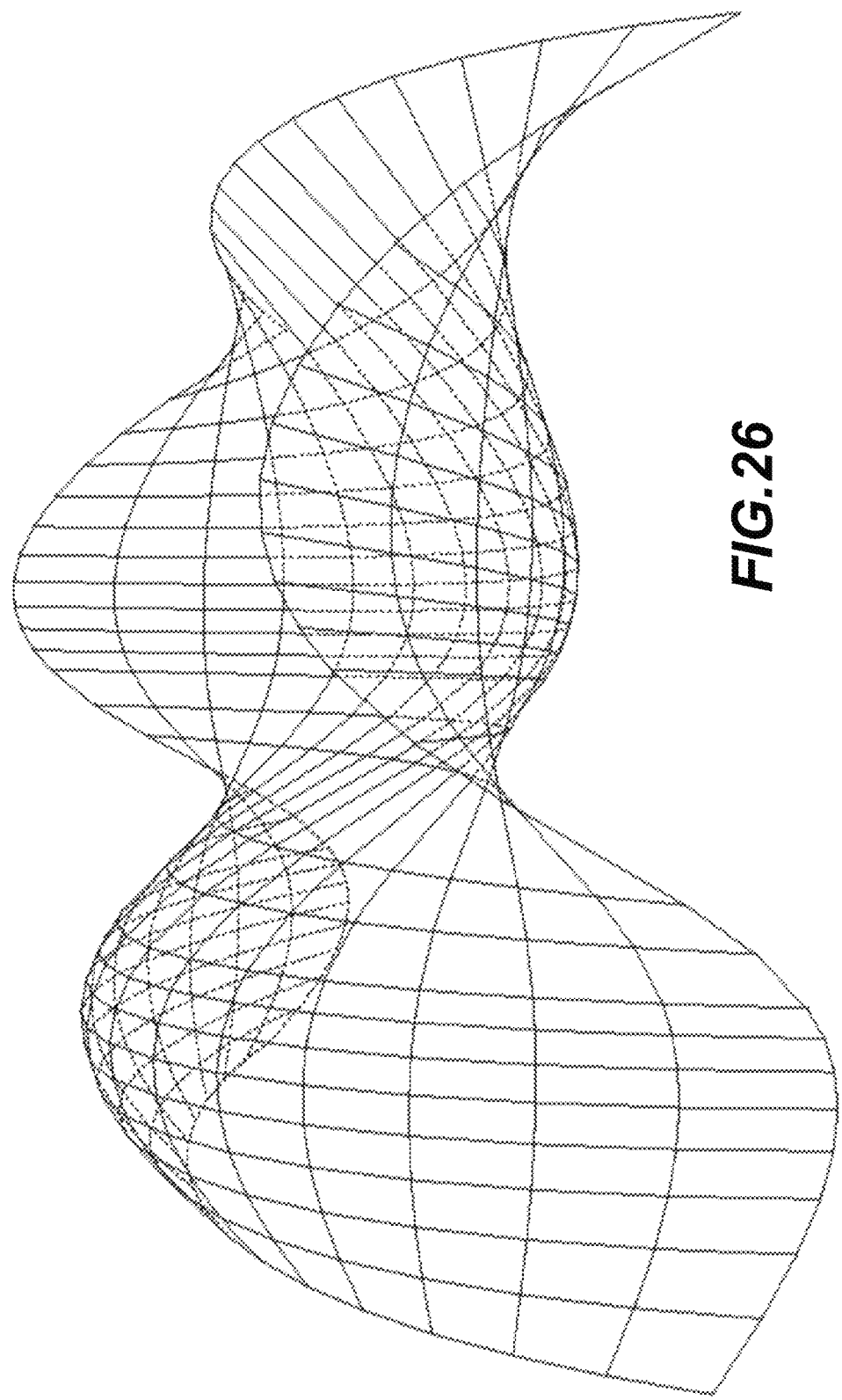
FIG. 26 illustrates an elevation view of an input mesh in accordance with one embodiment.
Figure 27:
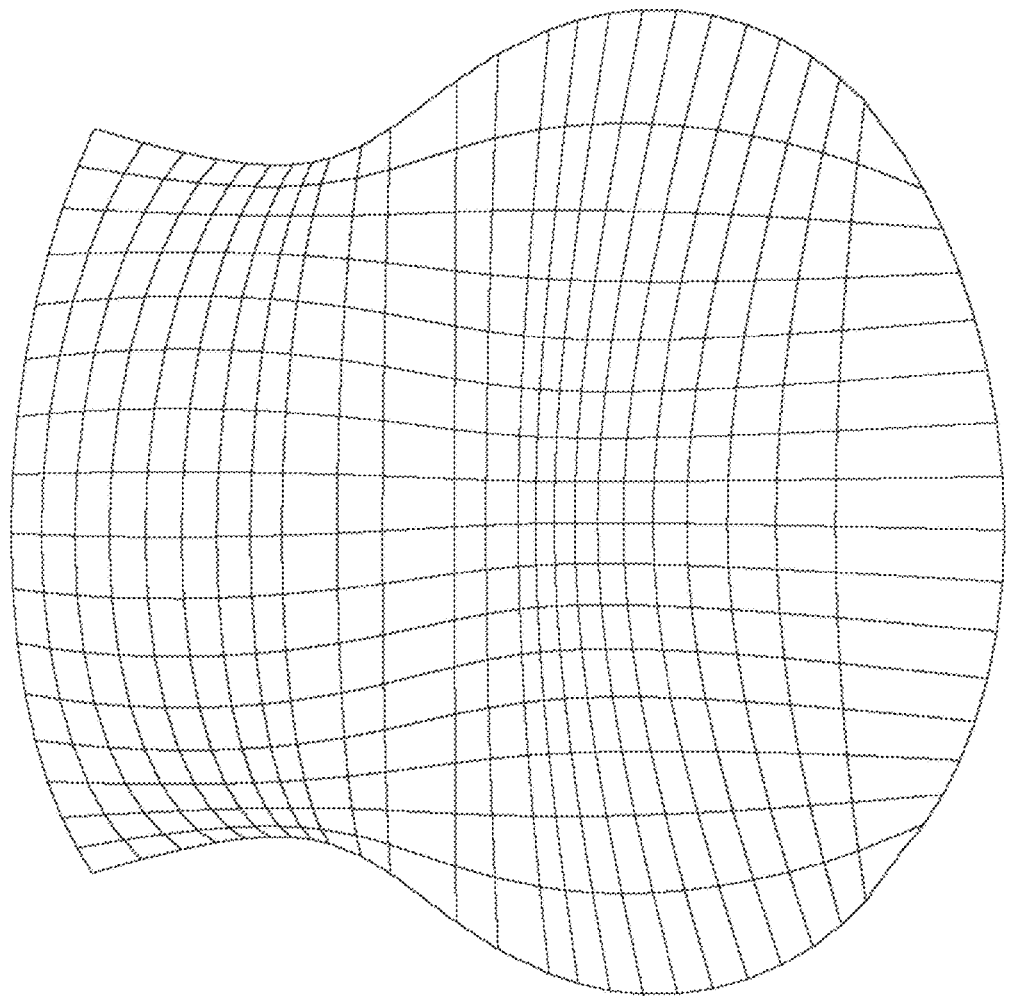
FIG. 27 illustrates a plan view the mesh shown in FIG. 26 in accordance with one embodiment.

Referring to FIG. 26 and FIG. 27, an elevation view (FIG. 26) and a plan view (FIG. 27) of an input mesh shape are shown in accordance with one embodiment. The input mesh shape provides a layout surface on which to apply a textile cell of a base shape. In one embodiment, the input mesh shape can be made up of different faces with any number of sides, as shown previously. In the illustrated embodiment, the input mesh has all four-sided faces. The illustrated input mesh shape includes both a hill and a valley, so the curvature changes throughout the mesh.

The textile cell can change based on properties of the seamless mesh, like curvature, or through the input of attractor points. To decrease the size of the textile unit, mesh faces can be subdivided, so one unit becomes multiple units.

Figure 28:
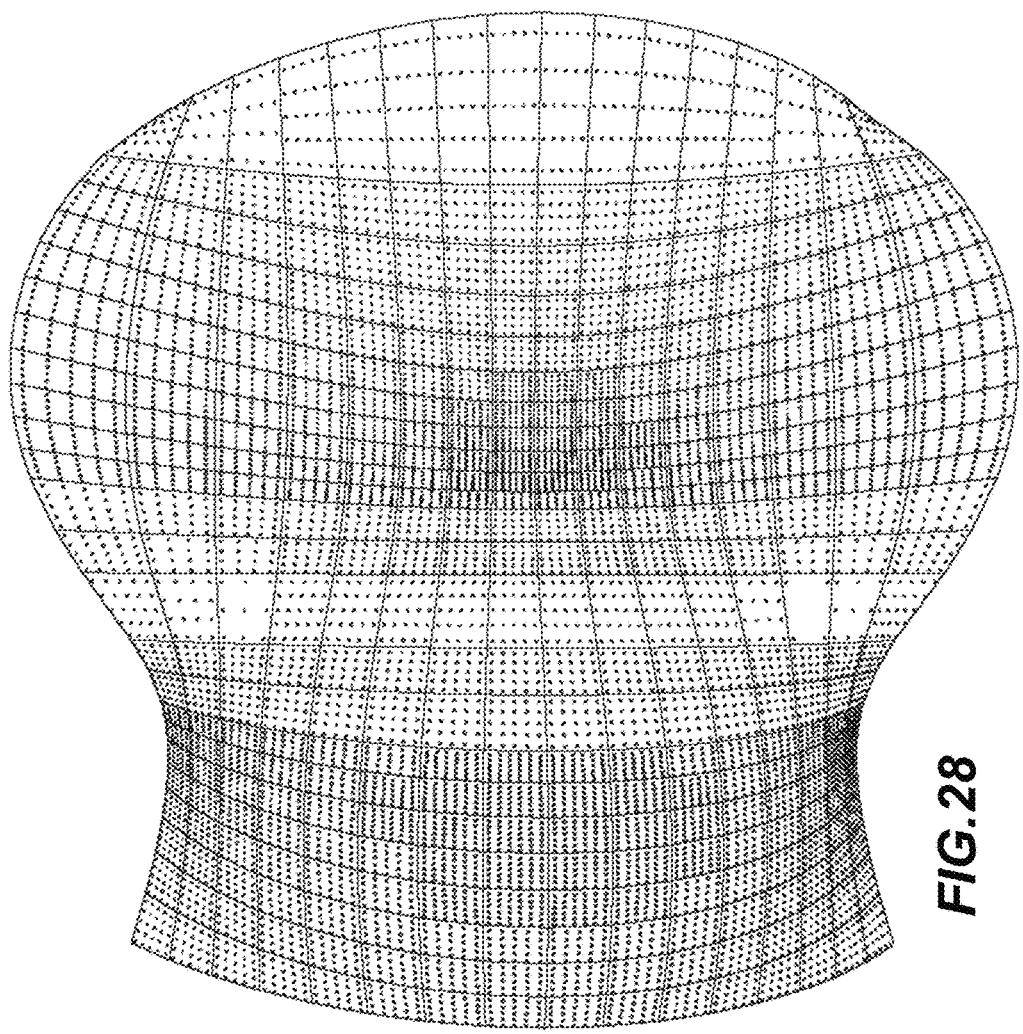
FIG. 28 illustrates a curvature map of the mesh shown in FIG. 26 in accordance with one embodiment.

Referring to FIG. 28, a map of curvature is shown, wherein more dots indicate areas of higher curvature. In one embodiment, the mesh is analyzed for curvature by comparing the angle between each mesh face and neighboring faces. In one embodiment, the mesh faces in higher areas of curvature are subdivided at least one level/generation.

Figure 29A:
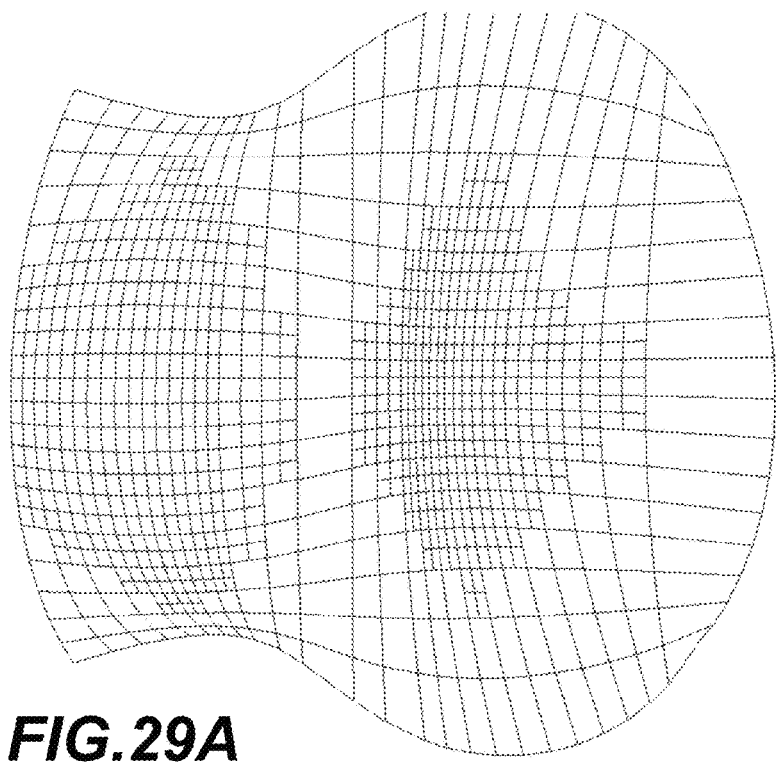
FIG. 29A and FIG. 29B illustrate top views of new subdivided input meshes in accordance with one embodiment.
Figure 29B:
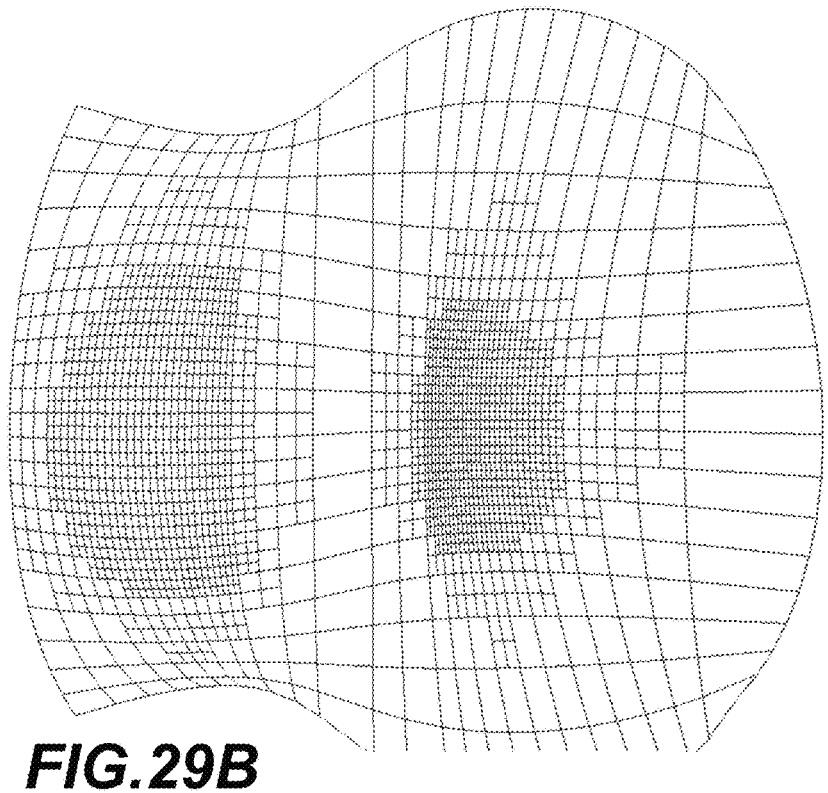
Figure 30A:
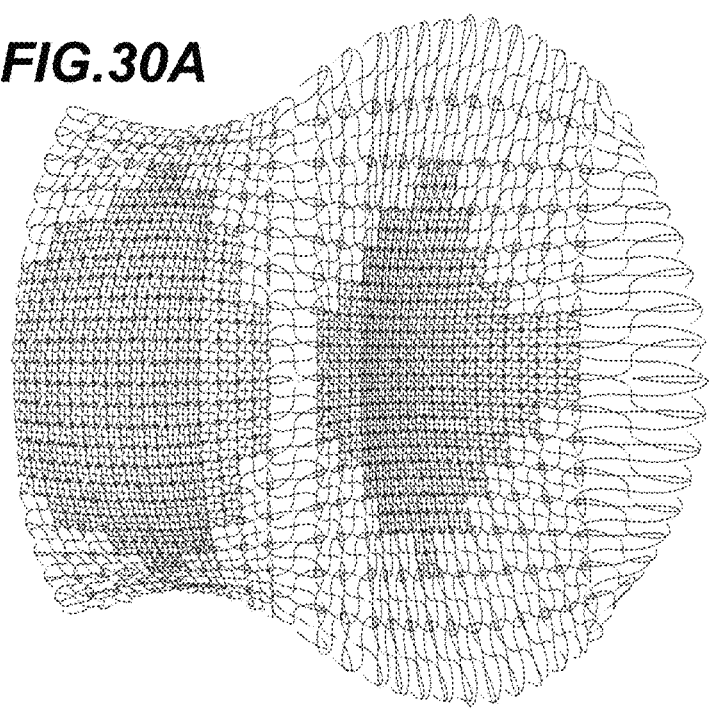
FIG. 30A and FIG. 30B illustrates top views of textile cells being applied to the new subdivided input meshes shown in FIG. 29A and FIG. 29B in accordance with one embodiment.
Figure 30B:
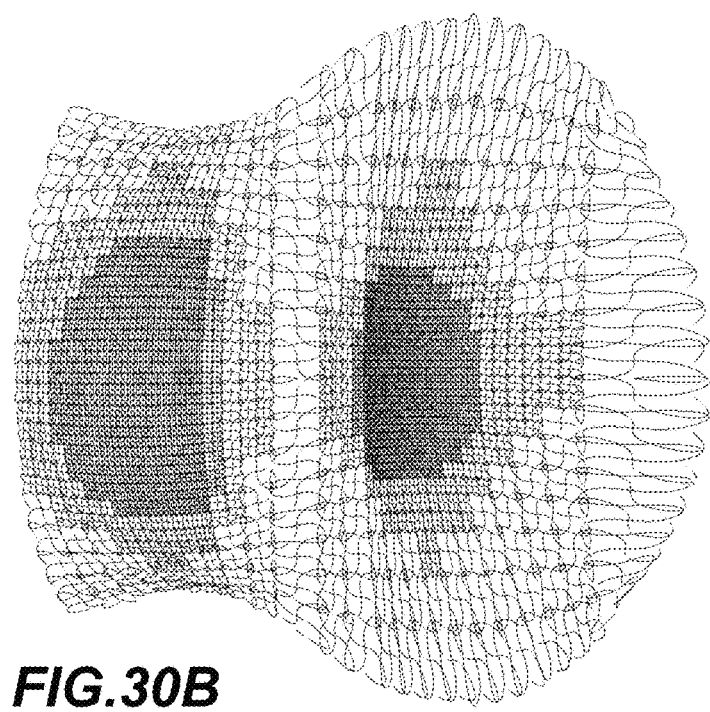

Referring to FIG. 29A and FIG. 29B, top views of new subdivided meshes are shown in accordance with one embodiment. In one embodiment, a new input mesh may be created by subdividing the original input mesh based on detected relative curvature. Specifically, the relationship between curvature & edge length of the mesh faces allow control of subdivision, so that in FIG. 29A one level of subdivision is performed and in FIG. 29B two levels of subdivision are performed. Each original base shape on the original mesh is tested against the curvature of the input shape in the area of that base shape. In one embodiment, if the curvature is greater than a user specified amount, the original base shape is subdivided in an effort to reduce the internal curvature of each cell. In FIGS. 30A and 30B, the template cell of each base shape is replaced with a textile cell. The new input meshes from FIG. 29 are now shown with a 4-sided textile applied to each template cell. FIG. 30A shows the mesh with one level of subdivision and FIG. 30B shows two levels of subdivision. FIG. 31 illustrates how a seamless mesh can use multiple base shapes. In particular, this mesh has a mix of triangular and quadrilateral faces and a cross unit is applied to all cells.

Figure 32A:
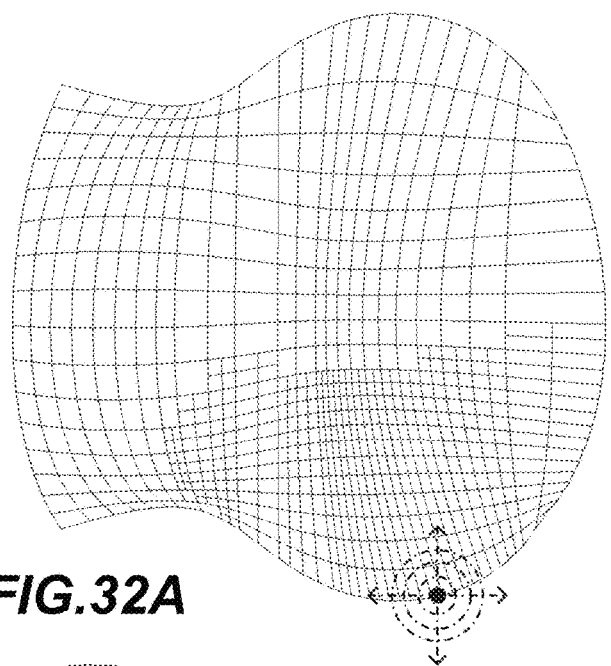
FIG. 32A and FIG. 32B illustrate top views of the input mesh with attractor points in accordance with one embodiment.
Figure 32B:
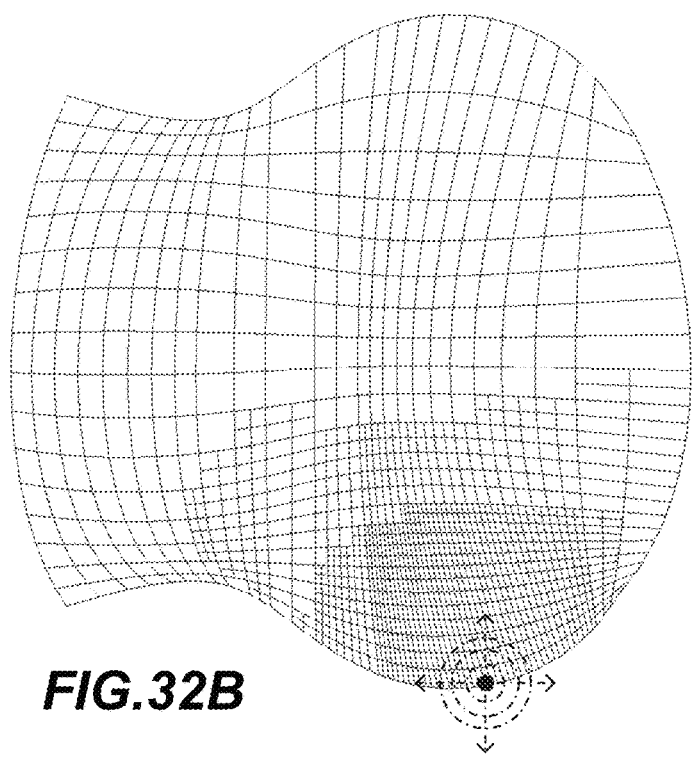
Figure 33A:
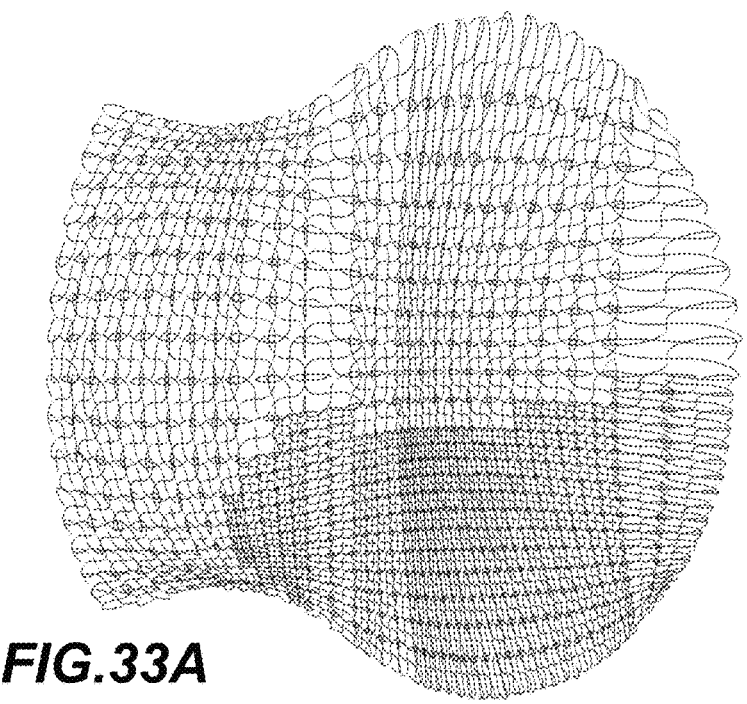
FIG. 33A and FIG. 33B illustrate top views of textile cells applied to the input mesh with attractor points in accordance with one embodiment.
Figure 33B:
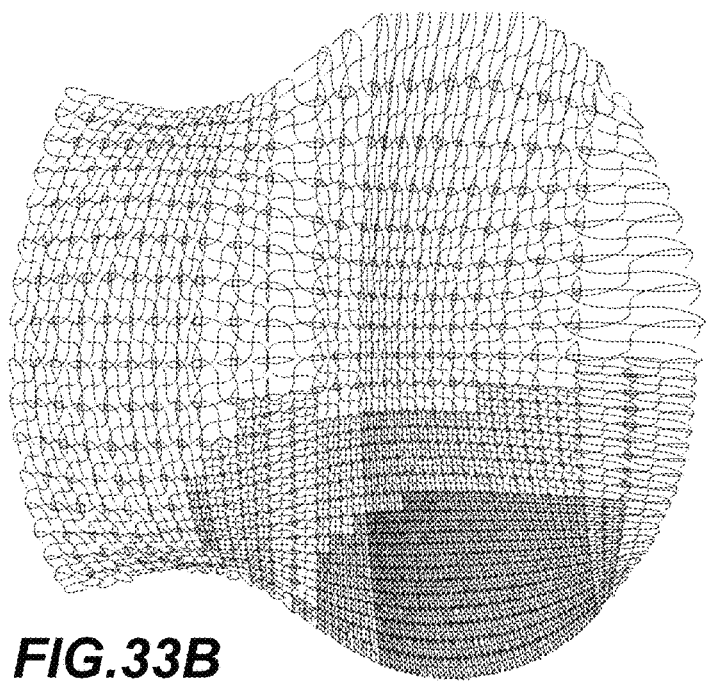

Referring now to FIG. 32A and FIG. 32B, application of attractor points to an input mesh are shown in accordance with one embodiment. Just as the mesh can be subdivided based on curvature, the mesh can also be subdivided based the distance of the base shape to attractor points as specified by the user. FIG. 32A shows one level of subdivision based on relative proximity to the attractor point and FIG. 32B shows two levels of subdivision based on relative proximity to the attractor point. FIG. 33A and FIG. 33B illustrate top views of textile cells applied to the input mesh with attractor points in accordance with one embodiment.

Figure 34:
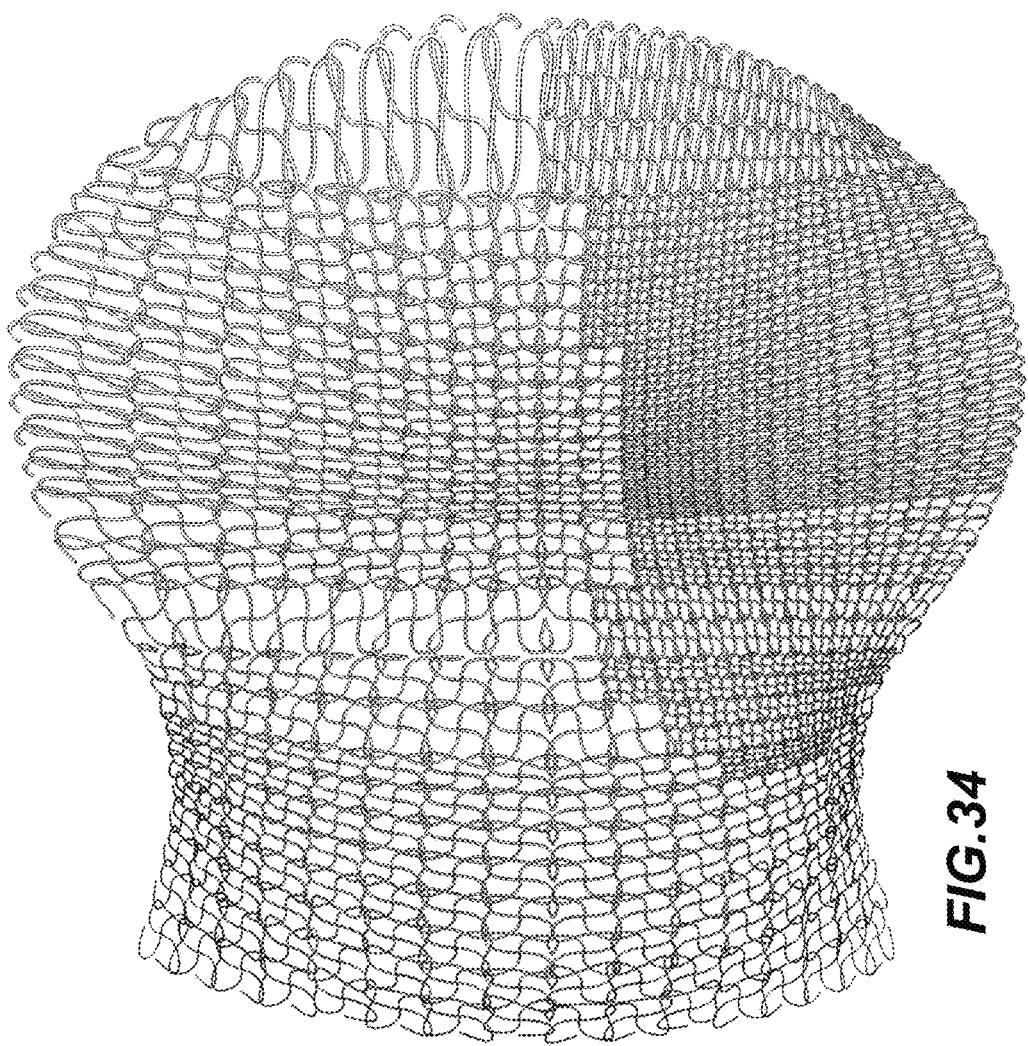
FIG. 34 illustrates a top view of a seamless mesh with curvature variation in accordance with one embodiment.

Referring to FIG. 34, a top view of a seamless mesh with individual textile cell variation based on curvature is shown in accordance with one embodiment. In contrast, in FIG. 35, an attractor point is applied to the same seamless mesh shown in FIG. 34. Accordingly, both Figures show how features, such as thickness, of the textile cell can also be dependent on mesh parameters or attractor points. More specifically, the relative thickness is based on an attractor point positioned in the upper left, with it getting thicker the farther away. In one embodiment, using existing adaptive manufacturing techniques the size of thickness is considered best between 0.7 mm & 1.5 mm diameter for nylon selective laser sintering. Typically, the thinner a strand, the better the flexibility and softer the resulting fabric.

Although specific embodiments have been illustrated and described herein, a whole variety of alternate and/or equivalent implementations may be substituted for the specific embodiments shown and described without departing from the scope of the present disclosure. This application is intended to cover any adaptations or variations of the embodiments discussed herein.

The invention claimed is:

1. A method of manufacturing a seamless mesh, comprising:
    obtaining at least one 3-D scan of a 3-D surface and/or a surface design to be at least partially covered by the seamless mesh;
    demarcating a portion of the obtained 3-D scan and/or surface design as an input shape for the seamless mesh;
    identifying at least one base shape for use in creating the seamless mesh on the input shape;
    replicating the at least one base shape to cover the input shape with replicated base shapes that form the seamless mesh; and
    modifying the at least one base shape in localized areas of the seamless mesh based on relative proximity curvature of the input shape.

2. The method as recited in claim 1, wherein the modifying the base shape includes changing at least one of opacity, thickness, stretch, drape, and size of the base shape.

3. The method as recited in claim 1, wherein the base shape is a space filling polyhedral.

4. The method as recited in claim 1, wherein the input shape is generated using the 3-D scan.

5. The method as recited in claim 1, wherein the replicating the base shape includes identifying at least one vertex of an original base shape, generating at least one additional base shape and rotating placement of the generated at least one additional base shape about the at least one vertex of the original base shape, upon placement of the at least one additional base shape about the original base shape continuing replication of the base shape using the at least one additional base shape as the new original base shape until the at least one additional base shape covers the input shape.

6. The method as recited in claim 1, wherein the at least one base shape is interlocked with at least one additional replicated base shape.

7. The method as recited in claim 1, wherein the at least one base shape and at least one additional replicated base shape are interconnected along at least one edge of the base shape.

8. The method as recited in claim 1, wherein the at least one base shape partially overlaps with at least one neighboring base shape.

9. The method as recited in claim 1, wherein
    the obtaining includes obtaining both a 3-D scan of a 3-D surface and a surface design that is independent of the 3-D scan of the 3-D surface, and
    the demarcating a portion of the obtained 3-D scan and/or surface design as an input shape for the seamless mesh includes:
        selecting a portion of the obtained 3-D scan based in part on the surface design; and
        modifying the surface design to conform to the 3-D surface based on the 3-D scan.

10. The method as recited in claim 1, wherein the surface design includes identification of relative design parameters desirable for the seamless mesh, the design parameters including at least one of opacity, thickness, stretch, drape, and size.

11. The method as recited in claim 1, wherein the surface design and/or the mesh is an article of clothing.

12. The method as recited in claim 1, further comprising printing the seamless mesh using additive manufacturing techniques.

13. The method as recited in claim 1, wherein the identifying the at least one base shape for the mesh, includes identifying different base shapes based on the input shape.

14. A computer program product residing on a non-transient computer readable storage medium having a plurality of instructions stored thereon which, when executed by a processor, cause the processor to perform operations comprising:
    demarcating, using surface-based coordinates, a plurality of areas of curvature on a digital representation of an input shape;
    generating a seamless mesh of base shapes to cover at least a portion of the input shape by replicating at least one base shape and applying each replicated base shape to the input shape;
    wherein each area of curvature represents a portion of the seamless mesh of replicated base shapes that covers at least a portion of the input shape; and
    modifying at least one base shape within each area of curvature of the seamless mesh to accommodate the curvature relative to other portions of the seamless mesh.

15. The method as recited in claim 14, further comprising predicting how a change to the at least one base shape will affect mesh properties in a designated area of curvature.

16. The method as recited in claim 14, wherein the borders of each of the areas of curvature represent a virtual seam within the seamless mesh and the modifying includes modifying at least one base shape along each virtual seam to interlock/interconnect at least one neighboring base shape of a neighboring area of curvature of the seamless mesh.

17. The method as recited in claim 14, wherein the seamless mesh is a design for an article of clothing.

18. The method as recited in claim 14, wherein the modifying includes changing at least one of opacity, thickness, stretch, drape, and size of the base shape used for the mesh in a designated area of curvature.

19. A product design system comprising:
at least one 3-D imaging device configured to generate a digital representation of a 3-D surface based on a surface scan received from at least one remote scanning device; and
at least one design server in communication with the at least one 3-D imaging device,
wherein the at least one design server is configured to:
selectively access available design projects;
join the digital representation of the 3-D surface with at least one design project,
wherein the at least one design project includes geometry of one or more base shapes for generating a seamless mesh of replicated base shapes; and
conform each of the joined design projects to the 3-D surface by:
identifying a plurality of areas of curvature on the 3-D surface;
generating a seamless mesh of base shapes to cover at least a portion of the 3-D surface by replicating at least one base shape and applying each replicated base shape to the 3-D surface;
correlating the plurality of areas of curvature on the 3-D surface with areas of curvature of the seamless mesh of base shapes that cover each area of curvature on the 3-D surface; and
modifying one or more base shapes in correlating areas of curvature of the joined design projects.

20. The system recited in claim 19, wherein the modifying includes changing at least one of opacity, thickness, stretch, drape, and size of at least one base shape used for the design project.

* * * * *